US011321339B2

(12) United States Patent
Punuru et al.

(10) Patent No.: US 11,321,339 B2
(45) Date of Patent: May 3, 2022

(54) DATA INTEGRATION FOR DISTRIBUTED AND MASSIVELY PARALLEL PROCESSING ENVIRONMENTS

(71) Applicant: ThoughtSpot, Inc., San Jose, CA (US)

(72) Inventors: Ravindra Punuru, Waxhaw, NC (US);
Sanjay Vyas, Charlotte, NC (US);
Sripathi Tumati, Charlotte, NC (US)

(73) Assignee: ThoughtSpot, Inc., San Jose, CA (US)

( * ) Notice: Subject to any disclaimer, the term of this patent is extended or adjusted under 35 U.S.C. 154(b) by 310 days.

(21) Appl. No.: 16/611,199

(22) PCT Filed: May 4, 2018

(86) PCT No.: PCT/US2018/031220
§ 371 (c)(1),
(2) Date: Nov. 5, 2019

(87) PCT Pub. No.: WO2018/204865
PCT Pub. Date: Nov. 8, 2018

(65) Prior Publication Data
US 2020/0167362 A1    May 28, 2020

Related U.S. Application Data

(60) Provisional application No. 62/502,594, filed on May 5, 2017.

(51) Int. Cl.
*G06F 16/00* (2019.01)
*G06F 16/25* (2019.01)
(Continued)

(52) U.S. Cl.
CPC .......... *G06F 16/254* (2019.01); *G06F 16/252* (2019.01); *G06F 16/283* (2019.01); *G06F 21/6218* (2013.01)

(58) Field of Classification Search
CPC .......... G06F 16/25; G06F 7/00; G06F 16/254; G06F 16/283; G06F 21/6218; G06F 16/252
See application file for complete search history.

(56) References Cited

U.S. PATENT DOCUMENTS 10,565,007 B2 * 2/2020 Aggarwal ............... G06F 9/451
2013/0218828 A1    8/2013 Lingamneni
(Continued)

OTHER PUBLICATIONS

Nguyen et al., "A Fuzzy Logic-Based Intelligent Controller For Contact Management Data Integration," IEEE, pp. 879-884, 1998. (Year: 1998).*

(Continued)

*Primary Examiner* — Cheryl Lewis
(74) *Attorney, Agent, or Firm* — Young Basile Hanlon & MacFarlane, P.C.

(57) ABSTRACT

Methods and systems for large scale data integration in distributed or massively parallel environments comprises a development phase wherein the results of a proposed job-flow can be viewed by the user during development, including the results of upstream units where the data sources and data targets can be any of a variety of different platforms, and further comprises the use of remote agents proximate to those data sources and data targets with direct communication between the associated agents under the direction of a topologically central controller to provide, among other things, improved security, reduced latency, reduced bandwidth requirements, and faster throughput.

20 Claims, 24 Drawing Sheets

(51) Int. Cl.
*G06F 16/28* (2019.01)
*G06F 21/62* (2013.01)

(56) References Cited

U.S. PATENT DOCUMENTS

| | | | |
|---|---|---|---|
| 2014/0040182 A1 | 2/2014 | Gilder et al. | |
| 2015/0039651 A1 | 2/2015 | Kinsely et al. | |
| 2016/0062808 A1* | 3/2016 | Aggarwal | G06F 16/254 |
| | | | 719/317 |
| 2020/0142730 A1* | 5/2020 | Aggarwal | G06F 9/5005 |

OTHER PUBLICATIONS

Di Lorenzo et al., "Data Integration in Mashups," SIGMOD Record, Mar. 2009, vol. 38, No. 1, pp. 59-66. (Year: 2009).*
International Search Report and Written Opinion issued in International Application No. PCT/US2018/031220 dated Aug. 8, 2018 in 13 pages.

* cited by examiner

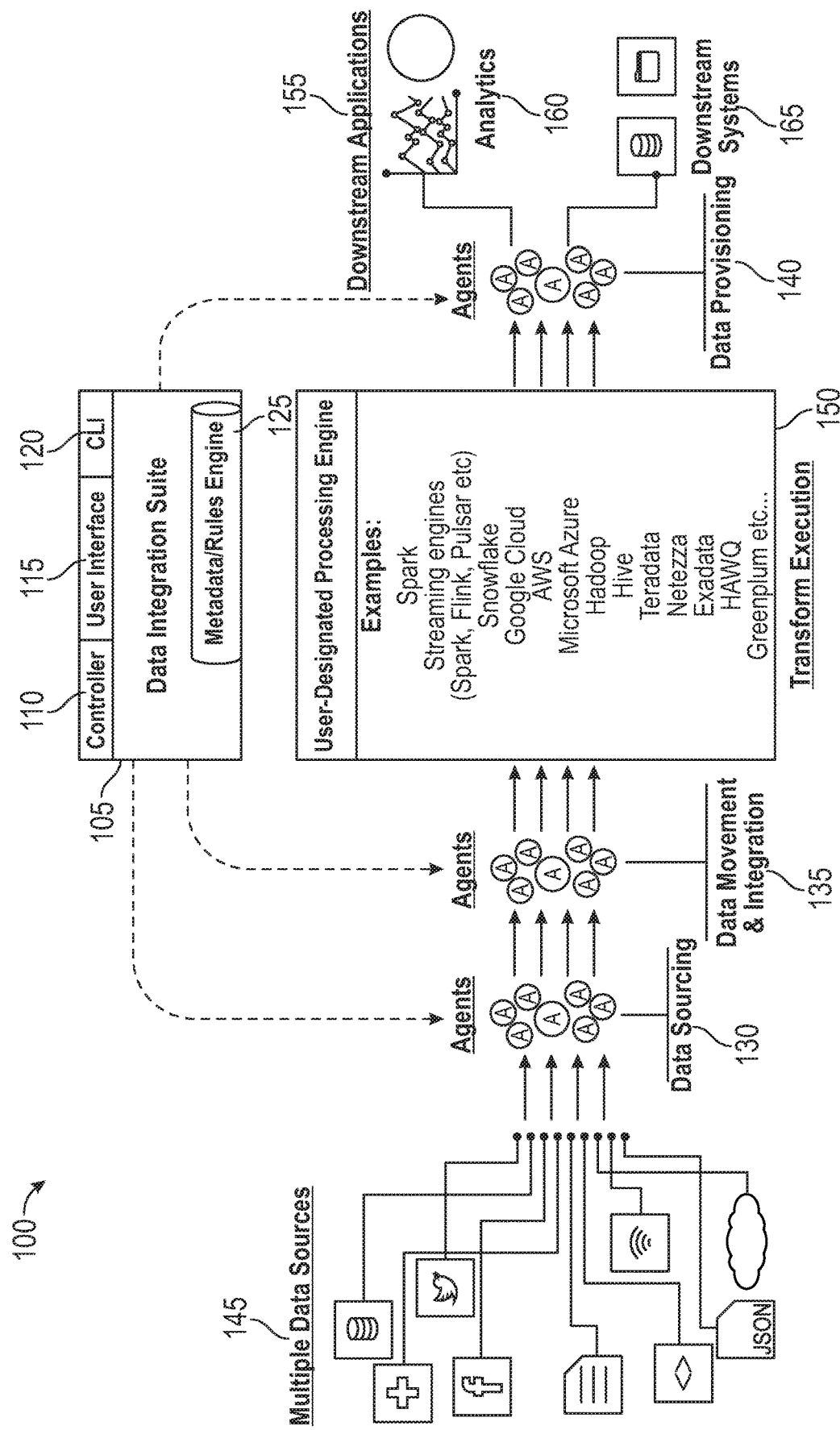

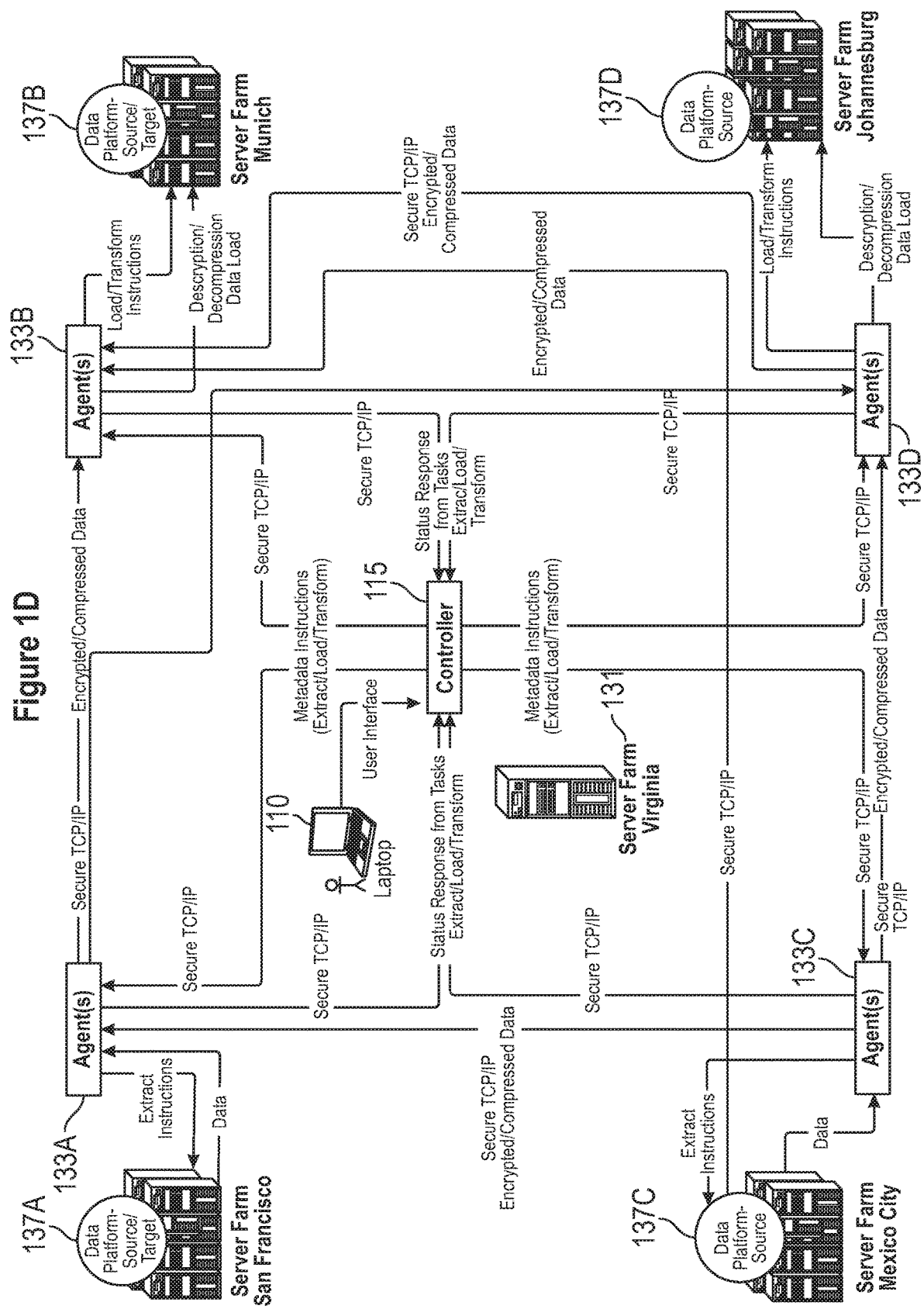

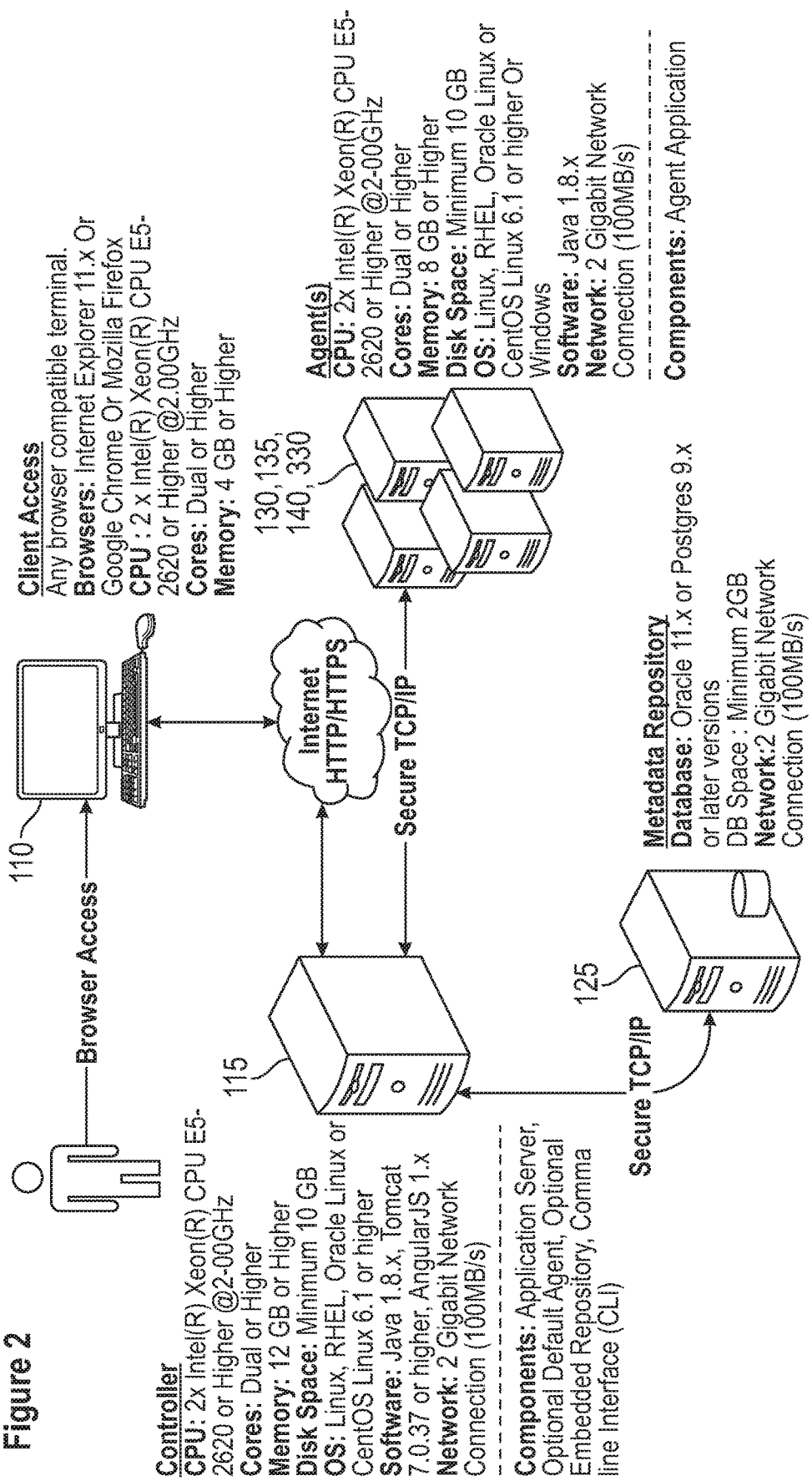

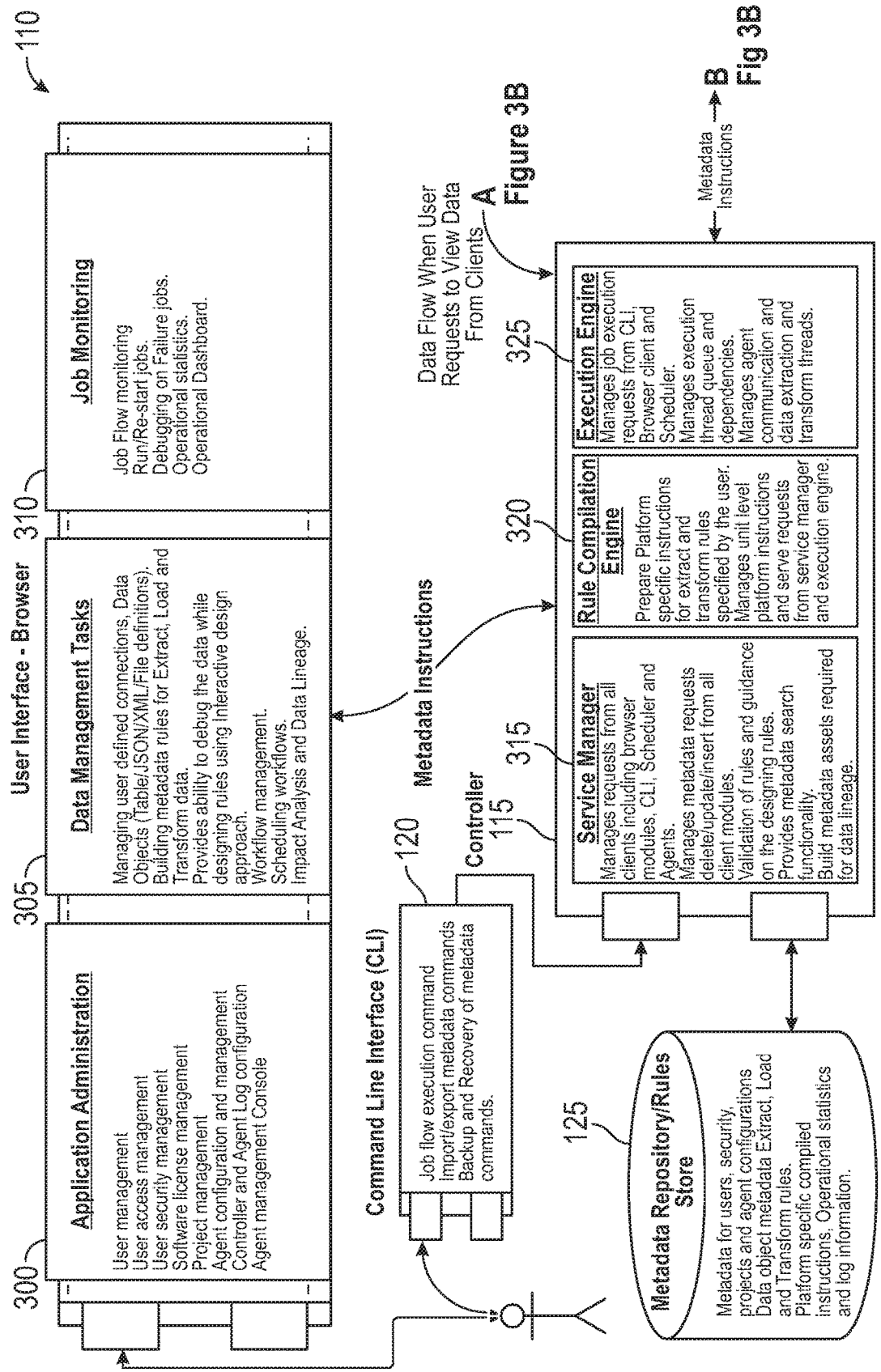
Figure 3A -
Data Integration Suite Components

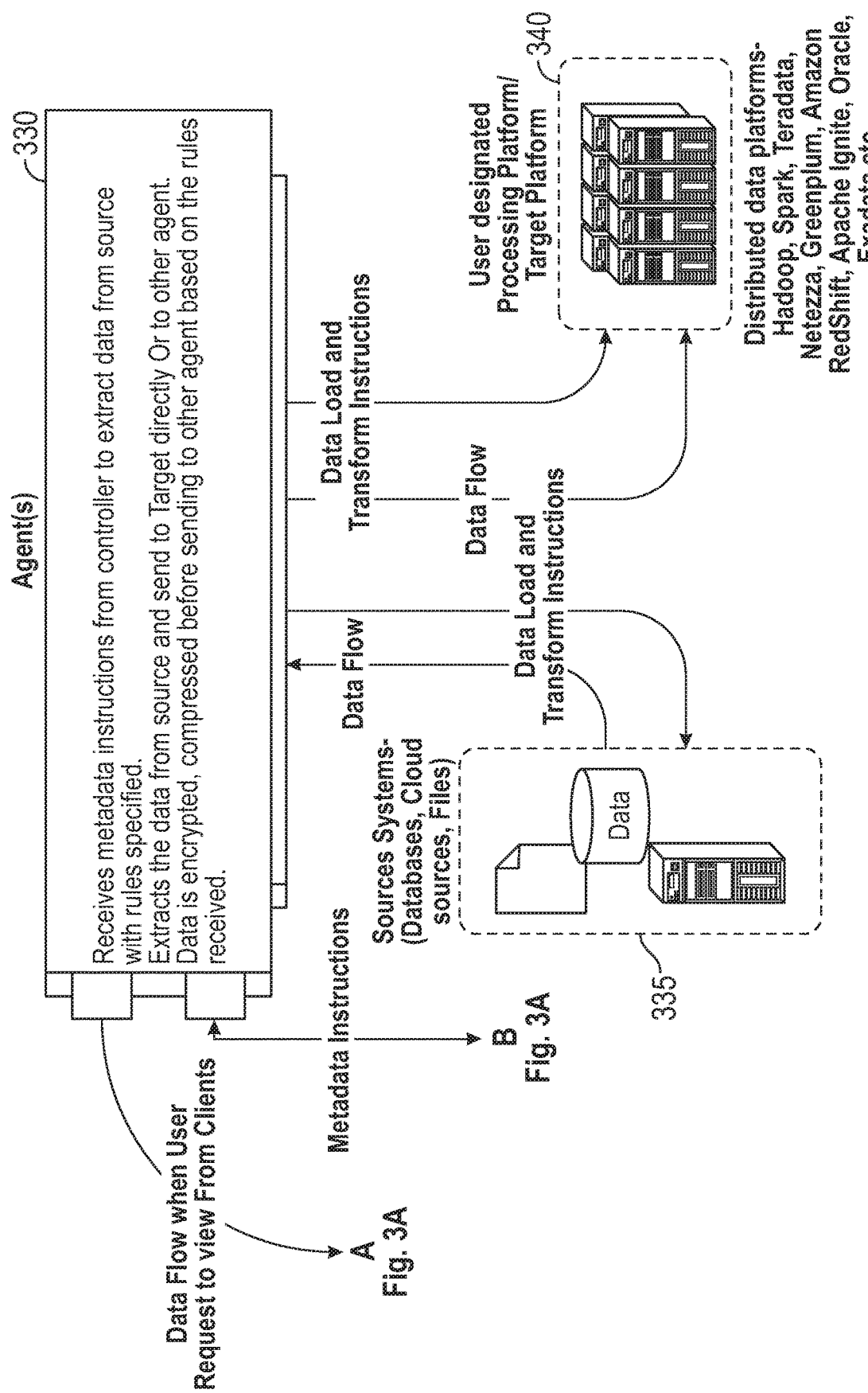
Figure 3B -
Data Integration Suite Components

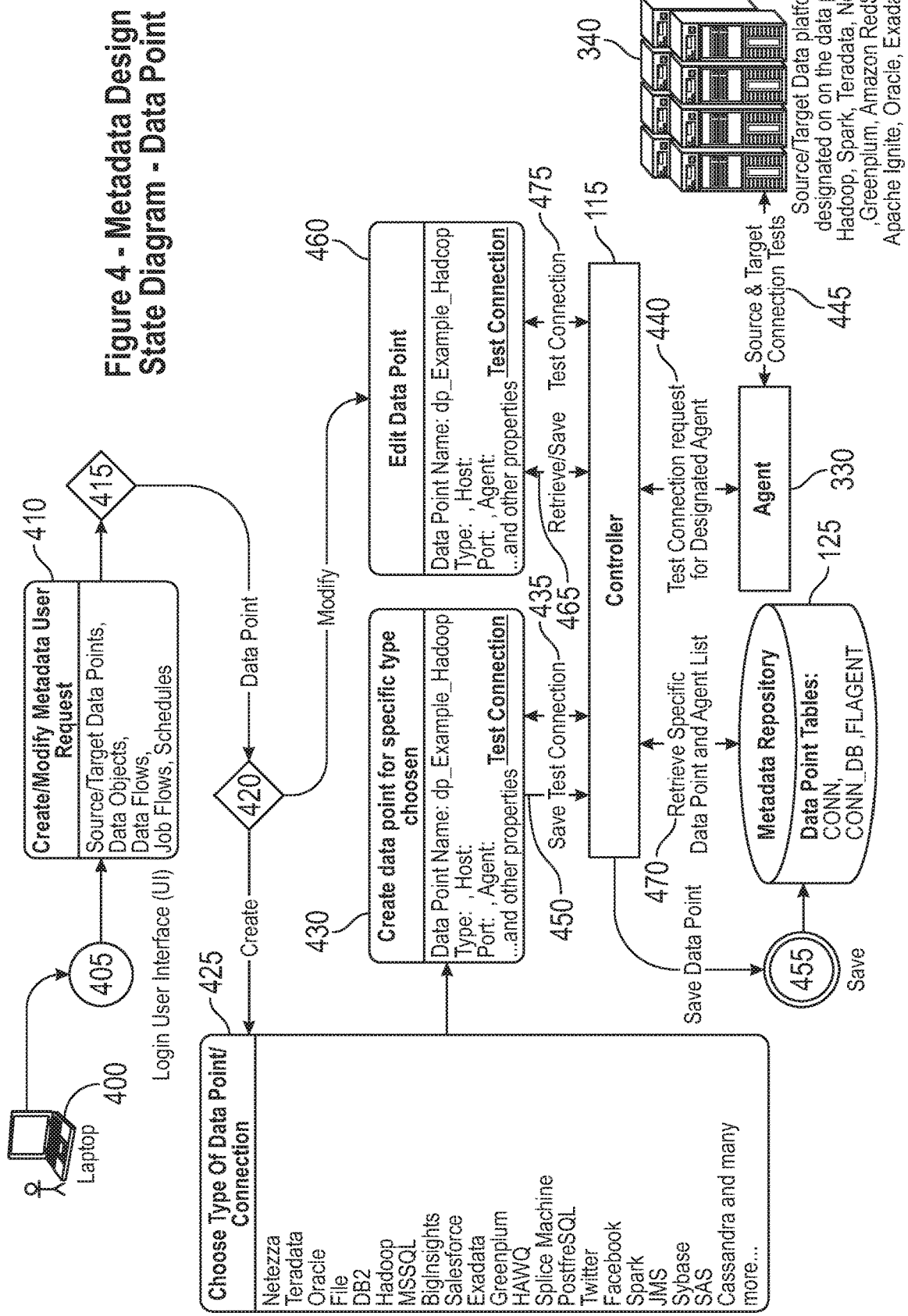

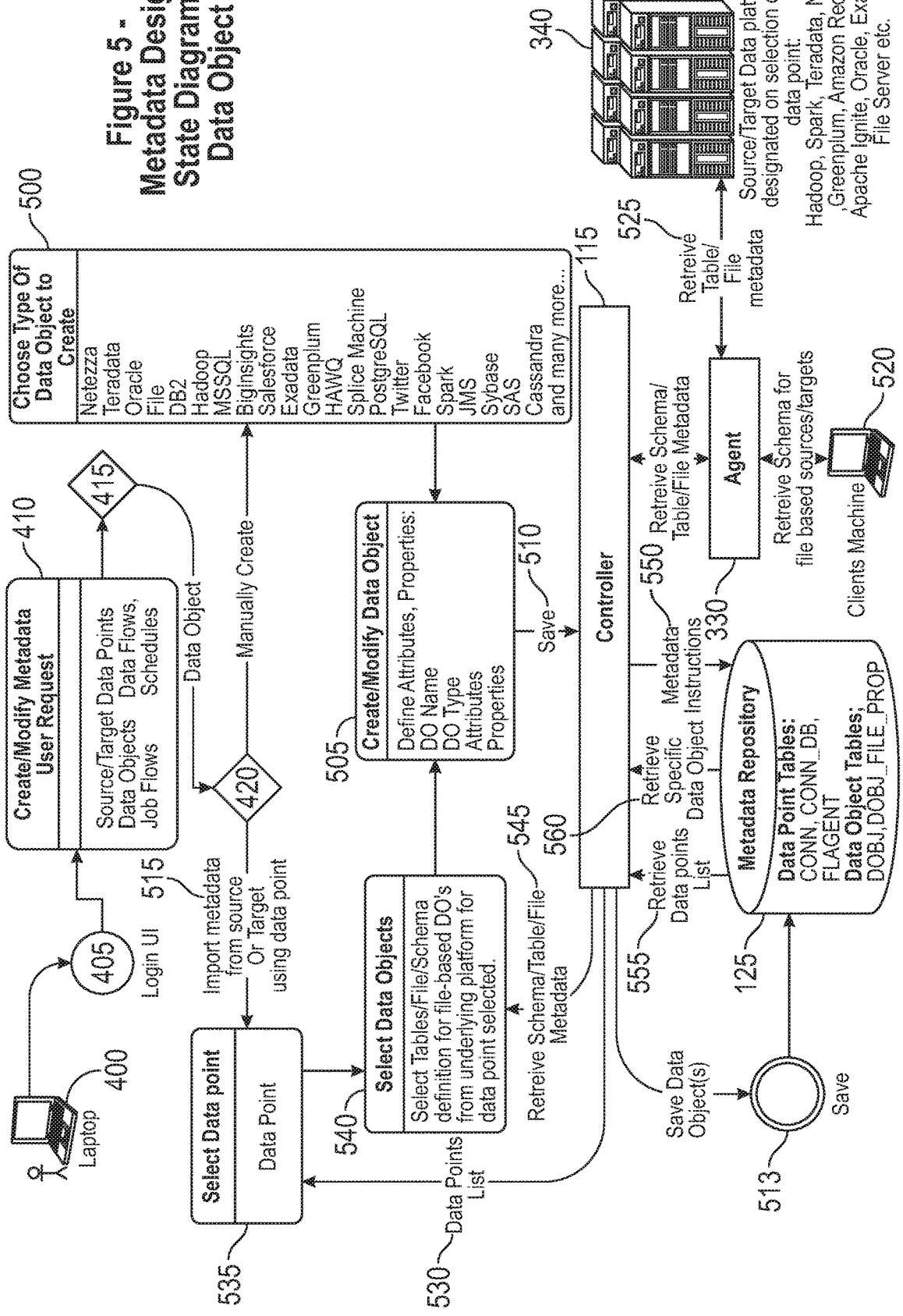

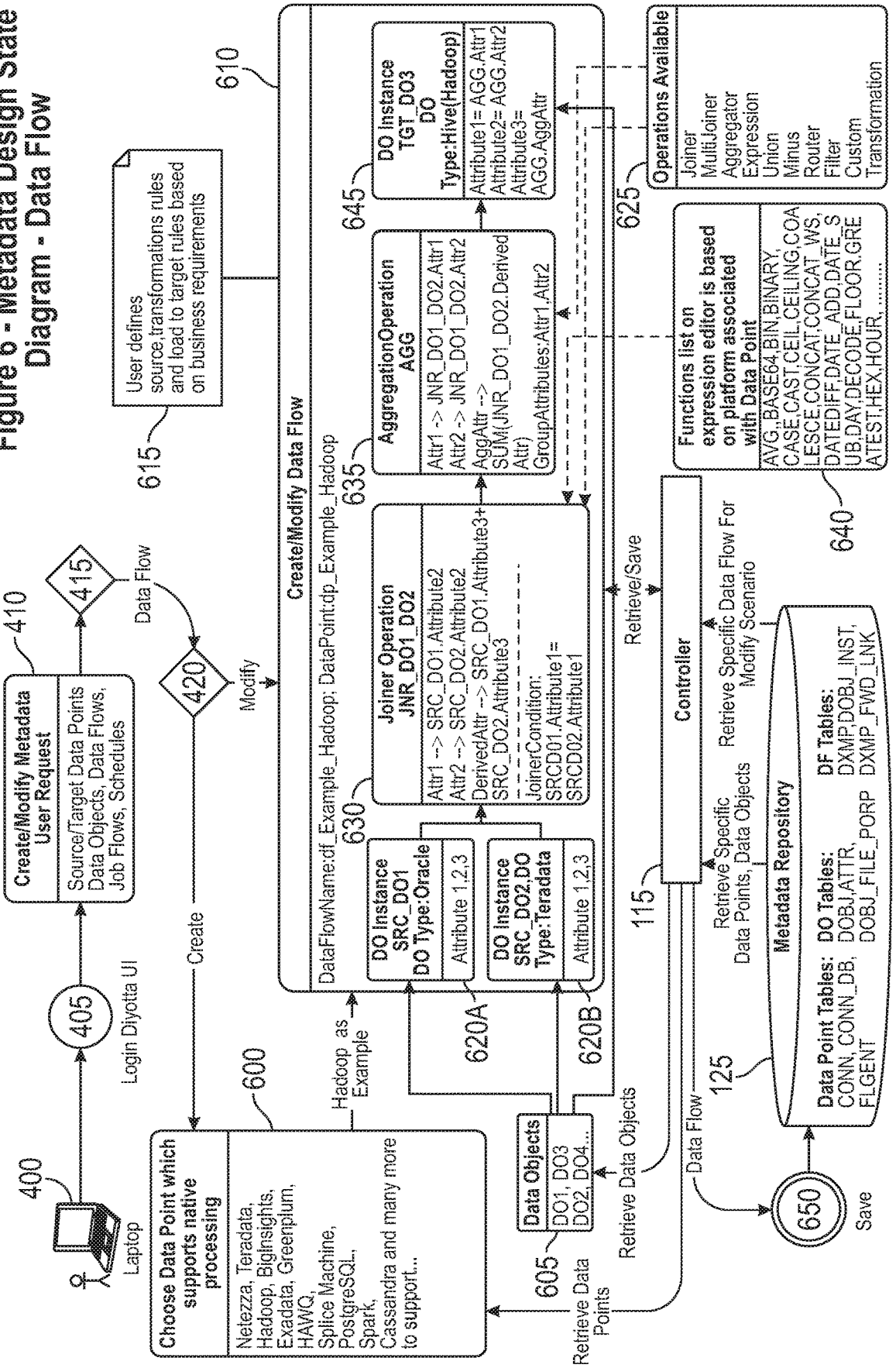

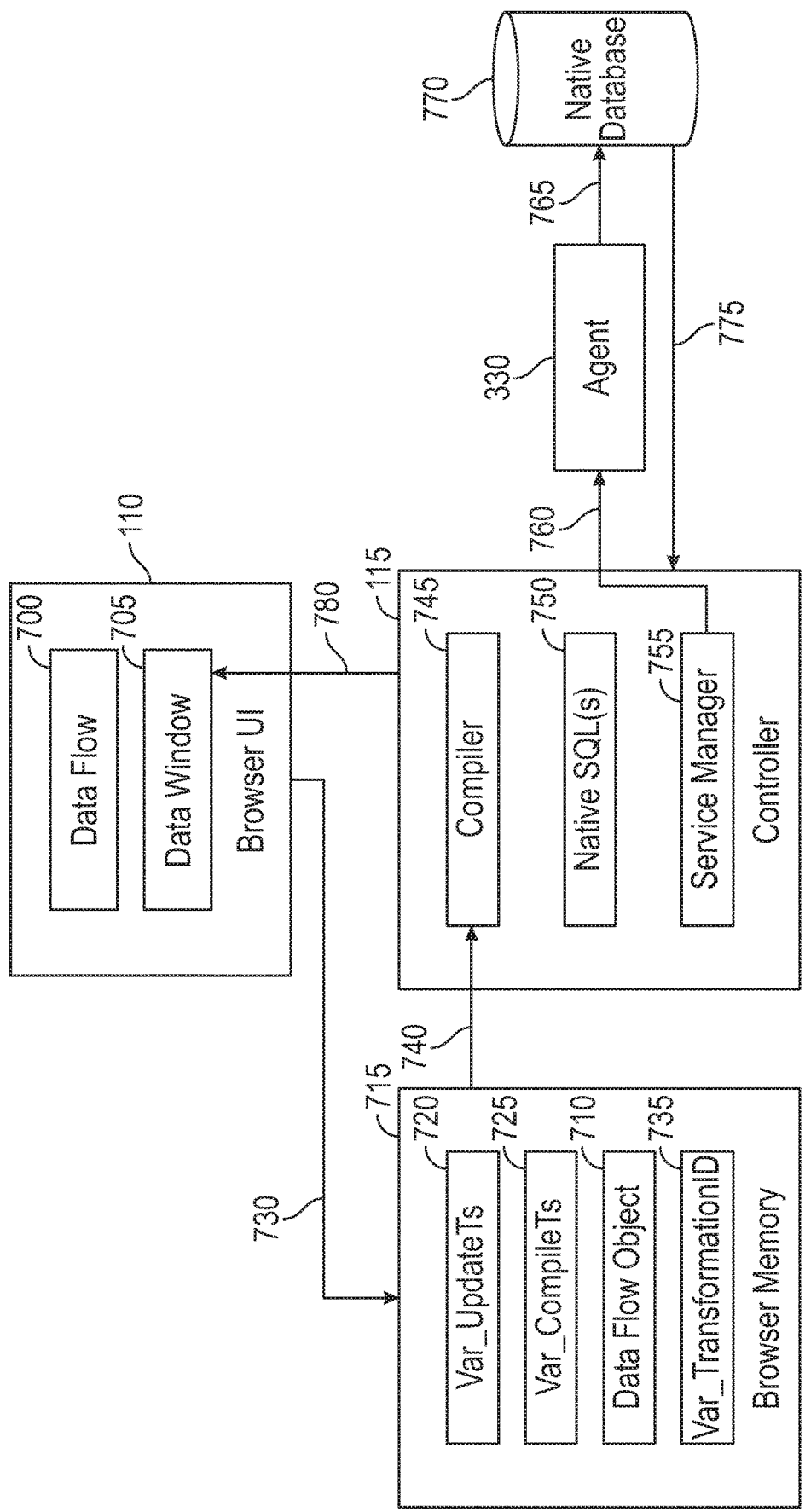
Figure 7 - Interactive Components - S/W

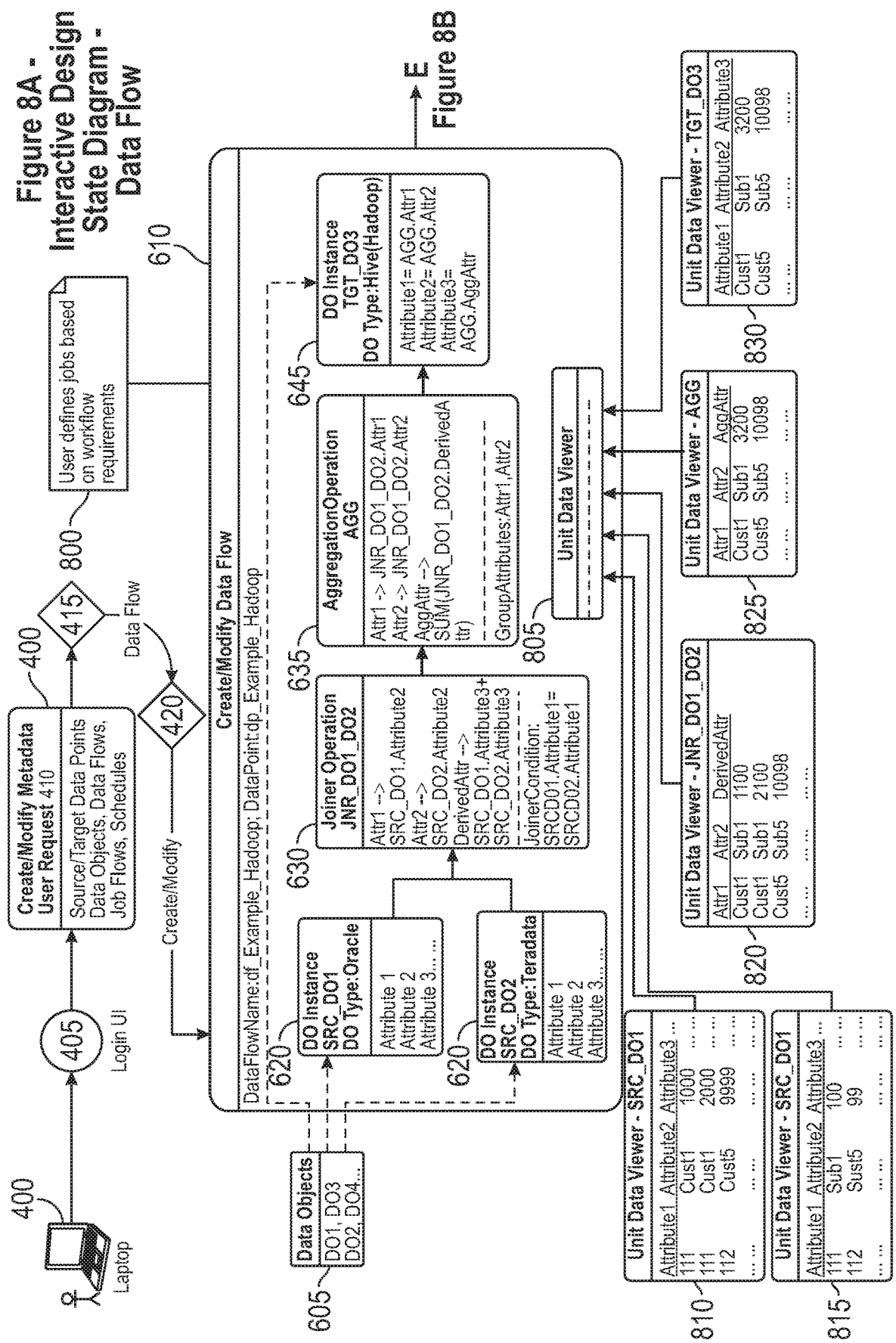
Figure 8A - Interactive Design State Diagram - Data Flow

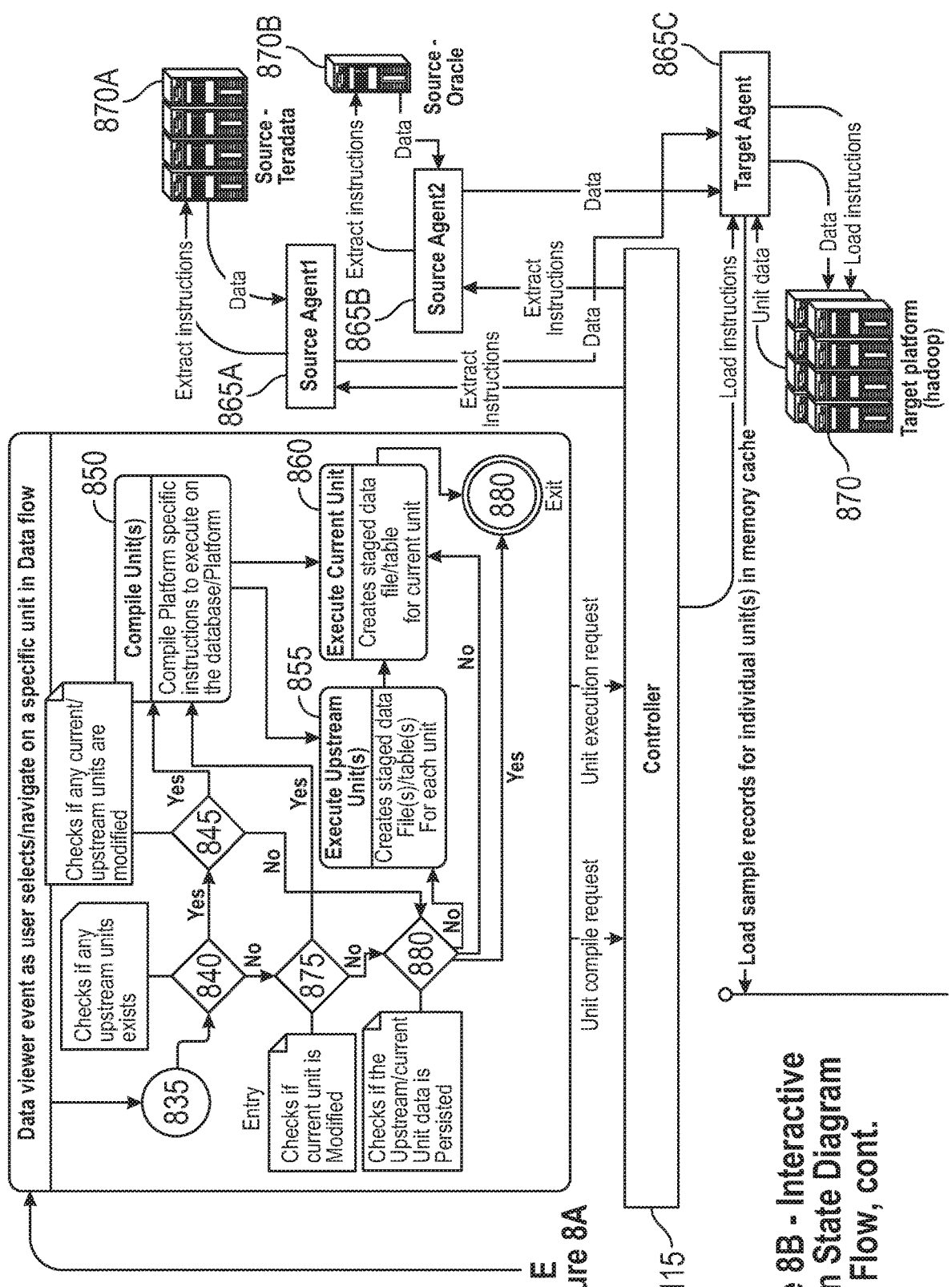
Figure 8B - Interactive Design State Diagram - Data Flow, cont.

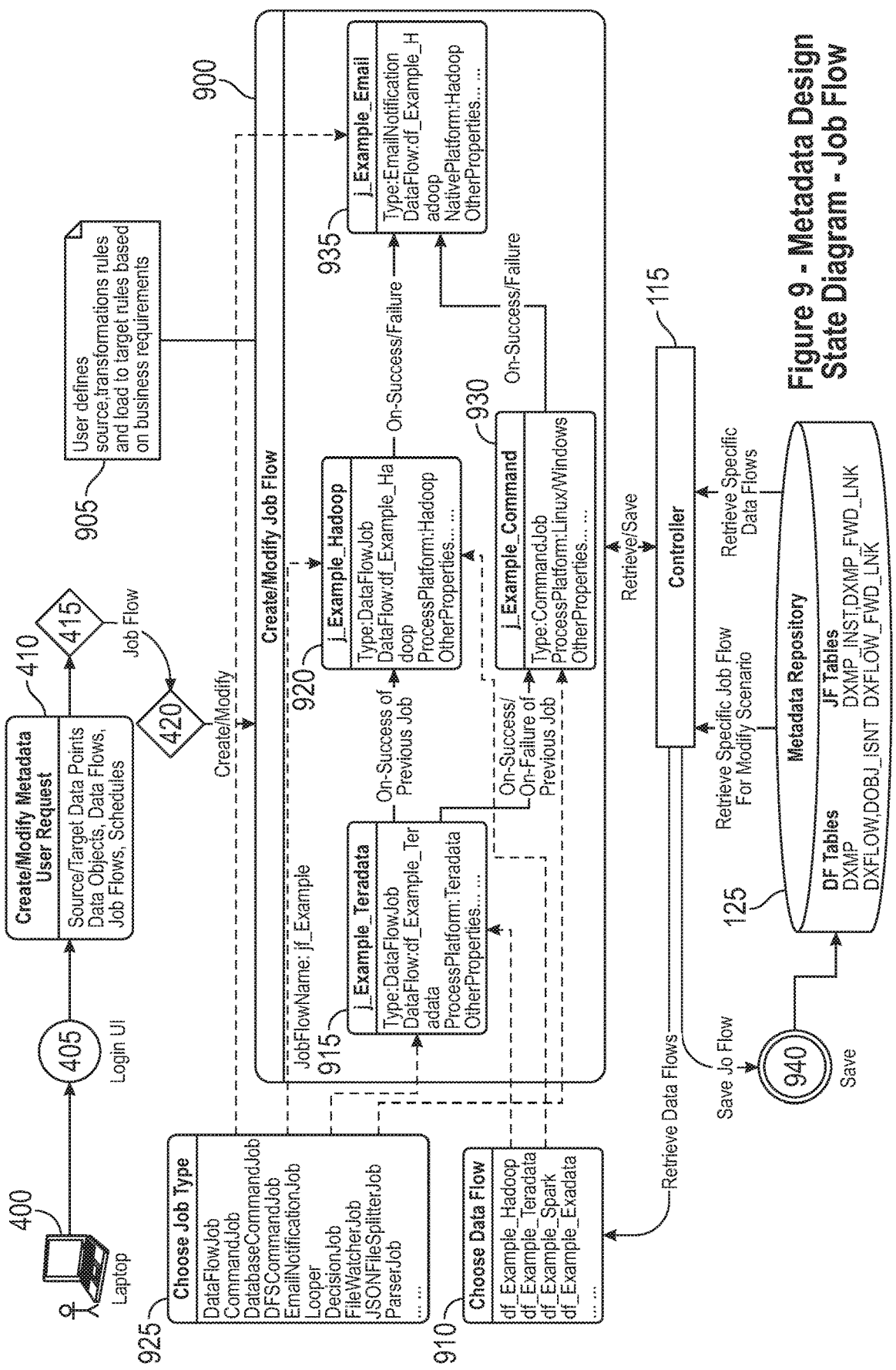
Figure 9 - Metadata Design State Diagram - Job Flow

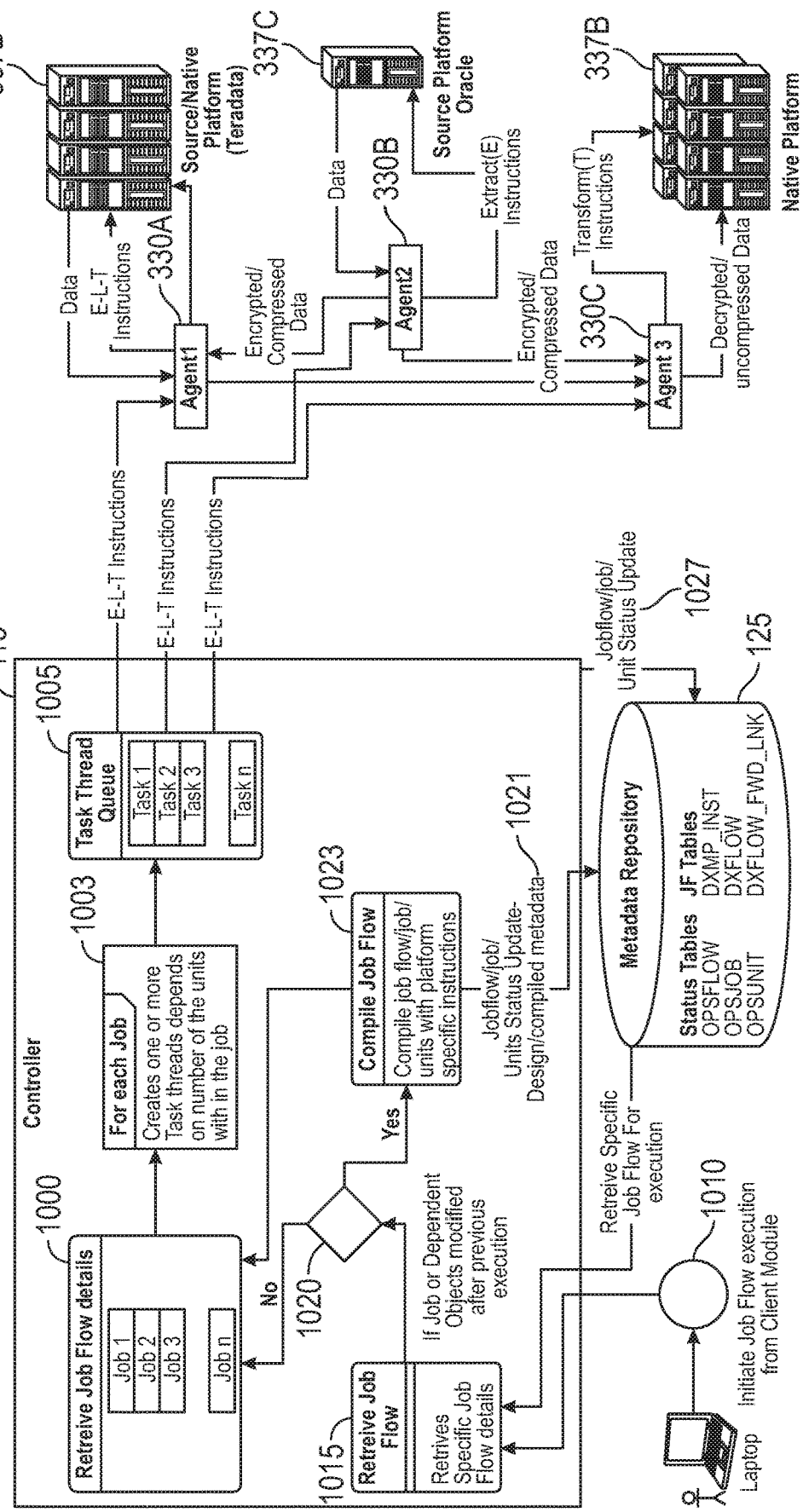
Figure 10A - Execution State Diagram - Job Flow

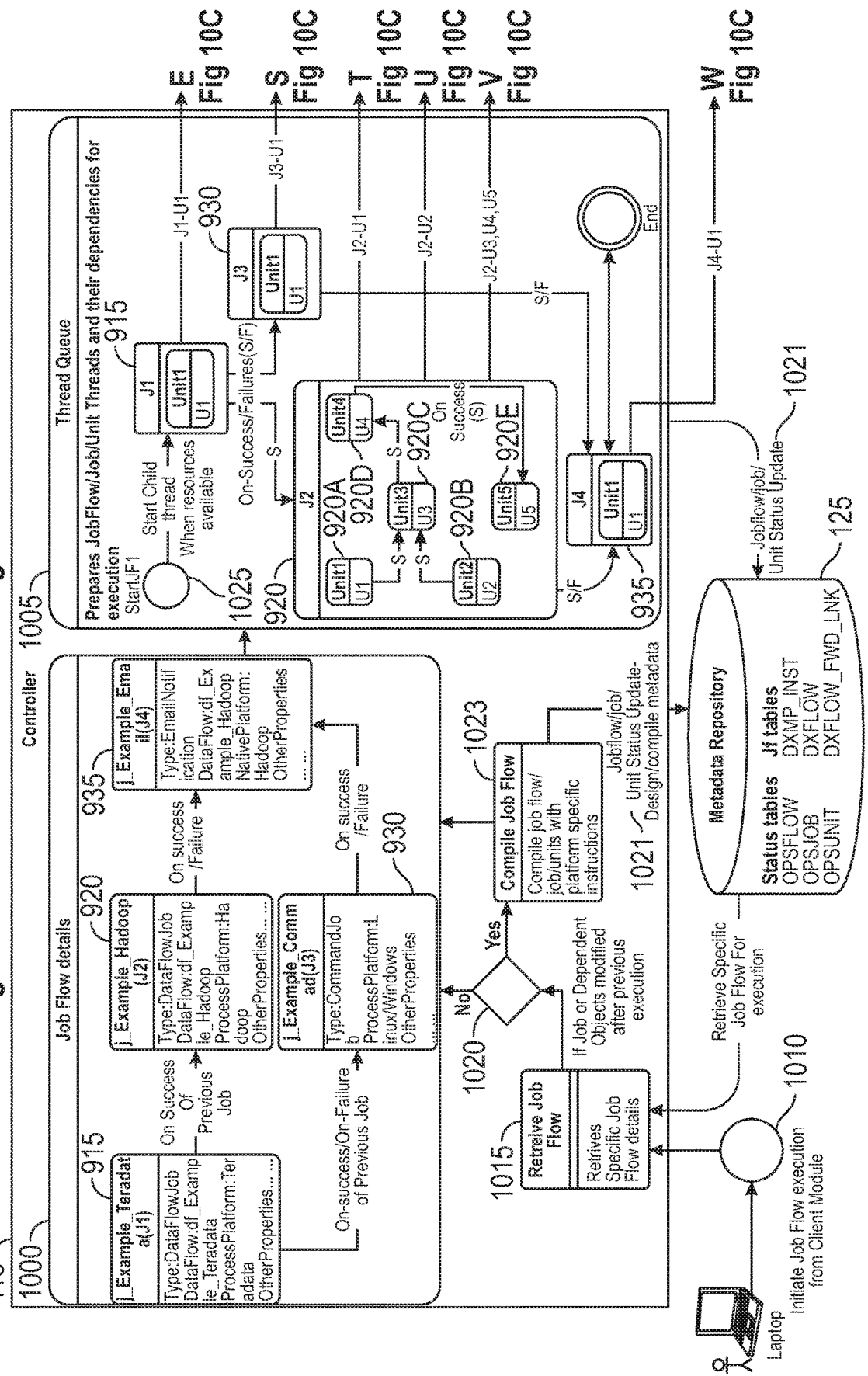
Figure 10B - Execution State Diagram - Job Flow

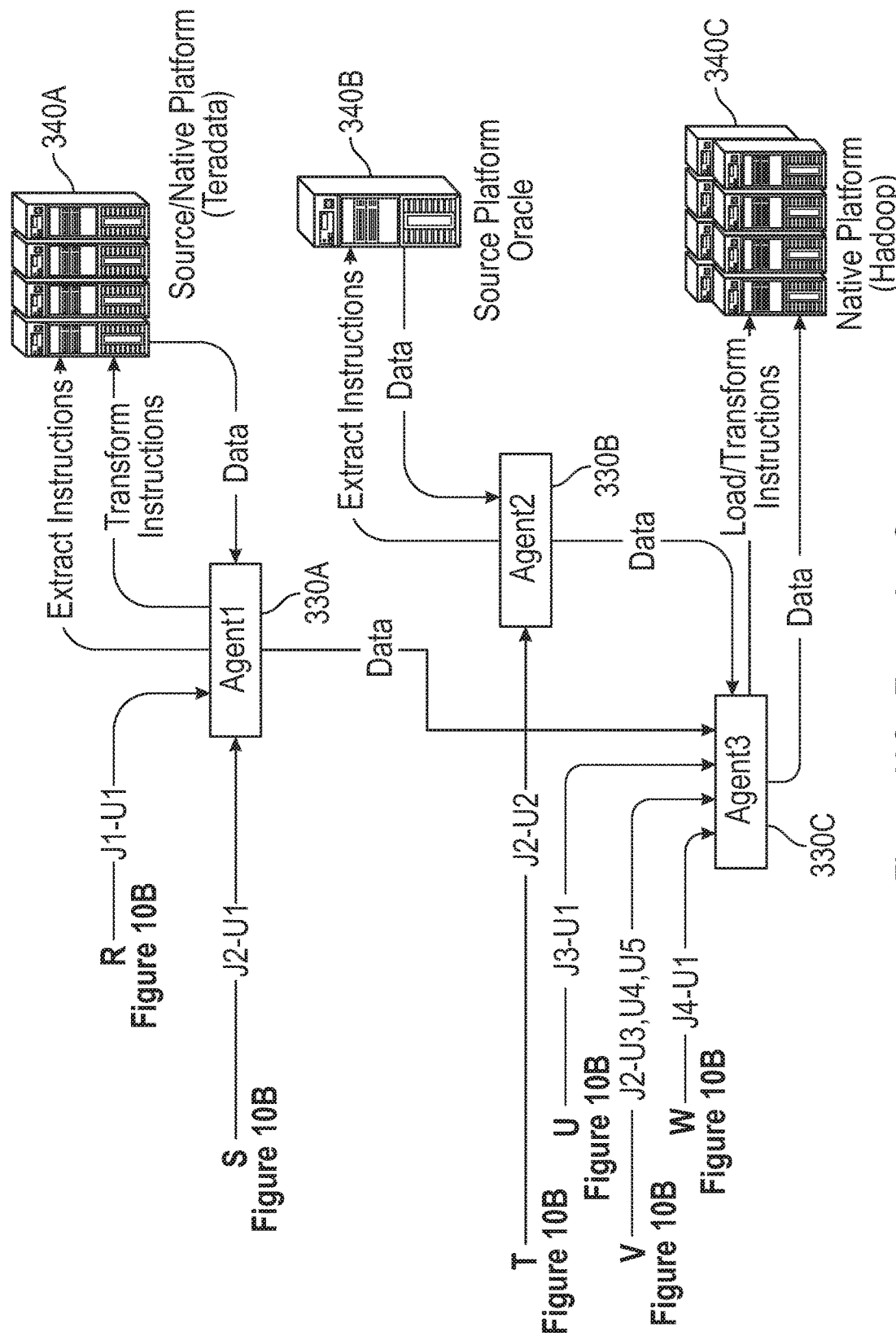
Figure 10C - Execution State Diagram - Job Flow

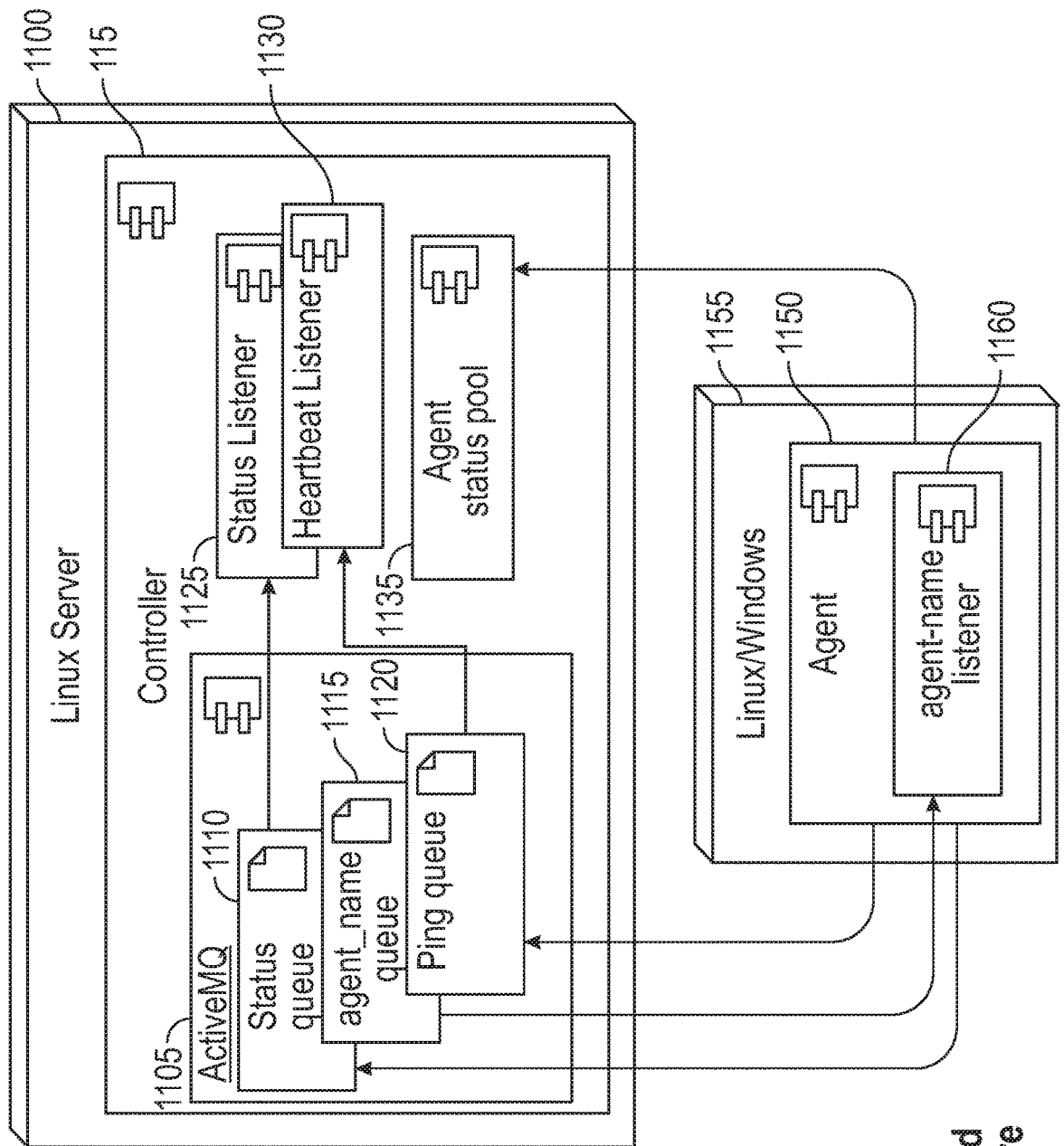
Figure 11 - Controller and Agent Sofware Component

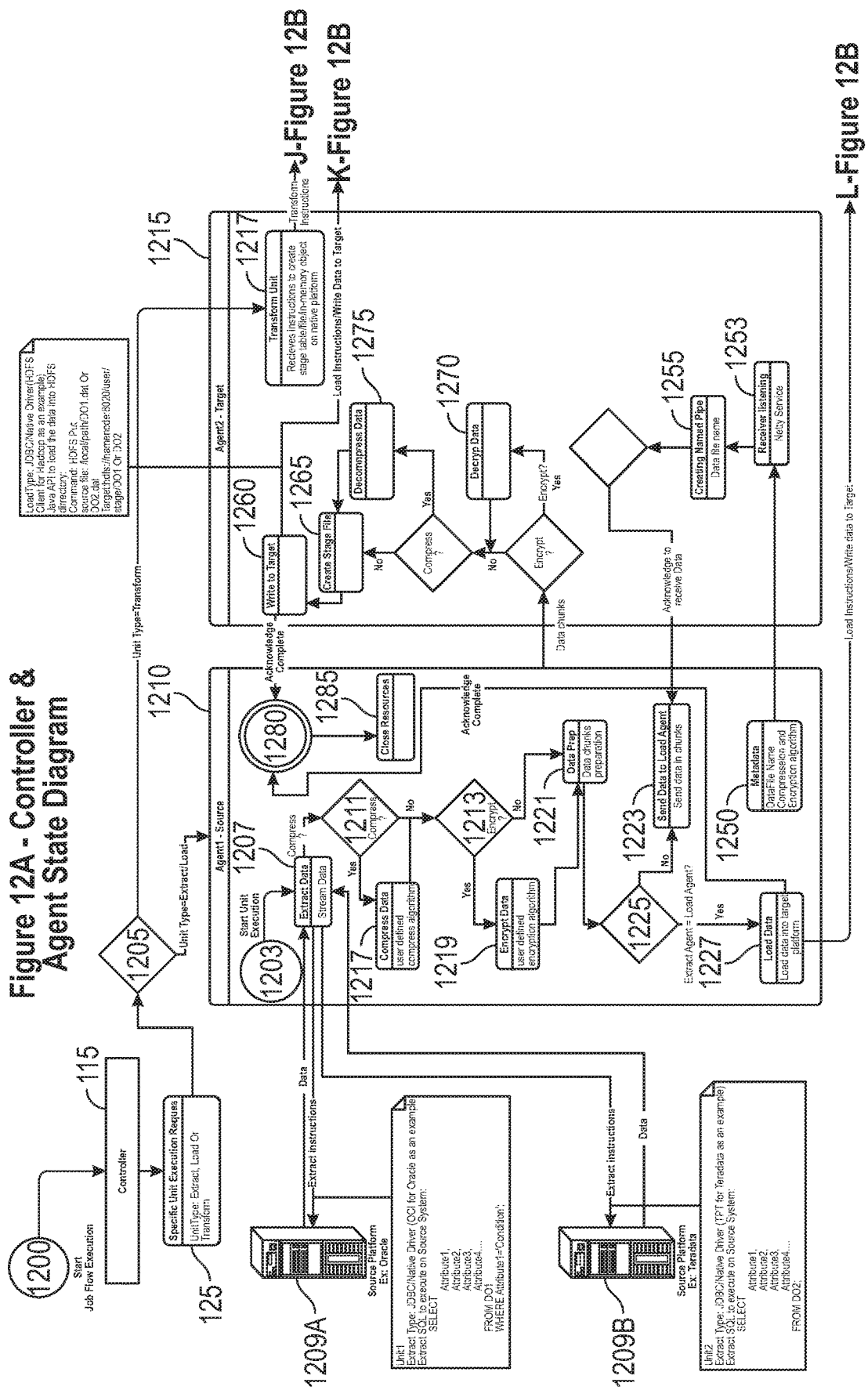

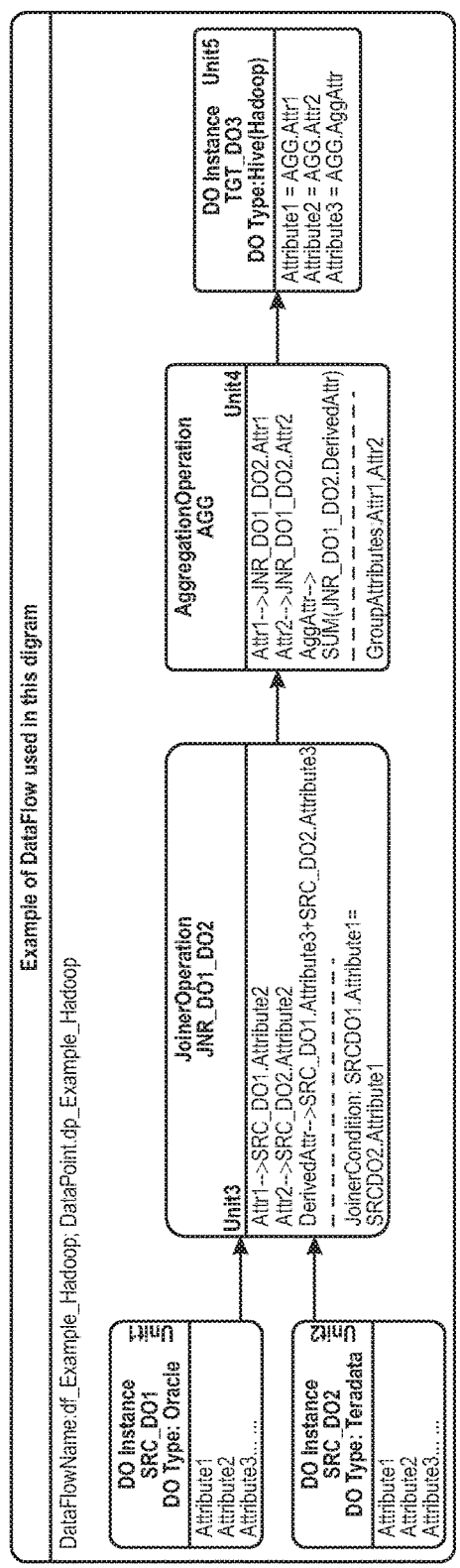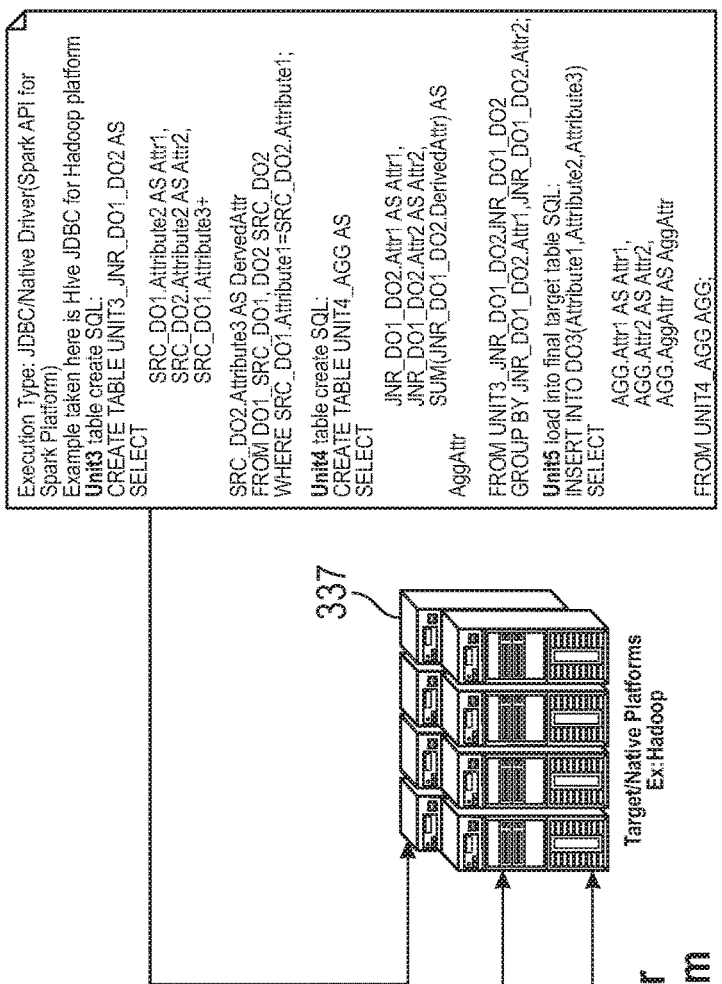
Figure 12B - Controller and Agent State Diagram

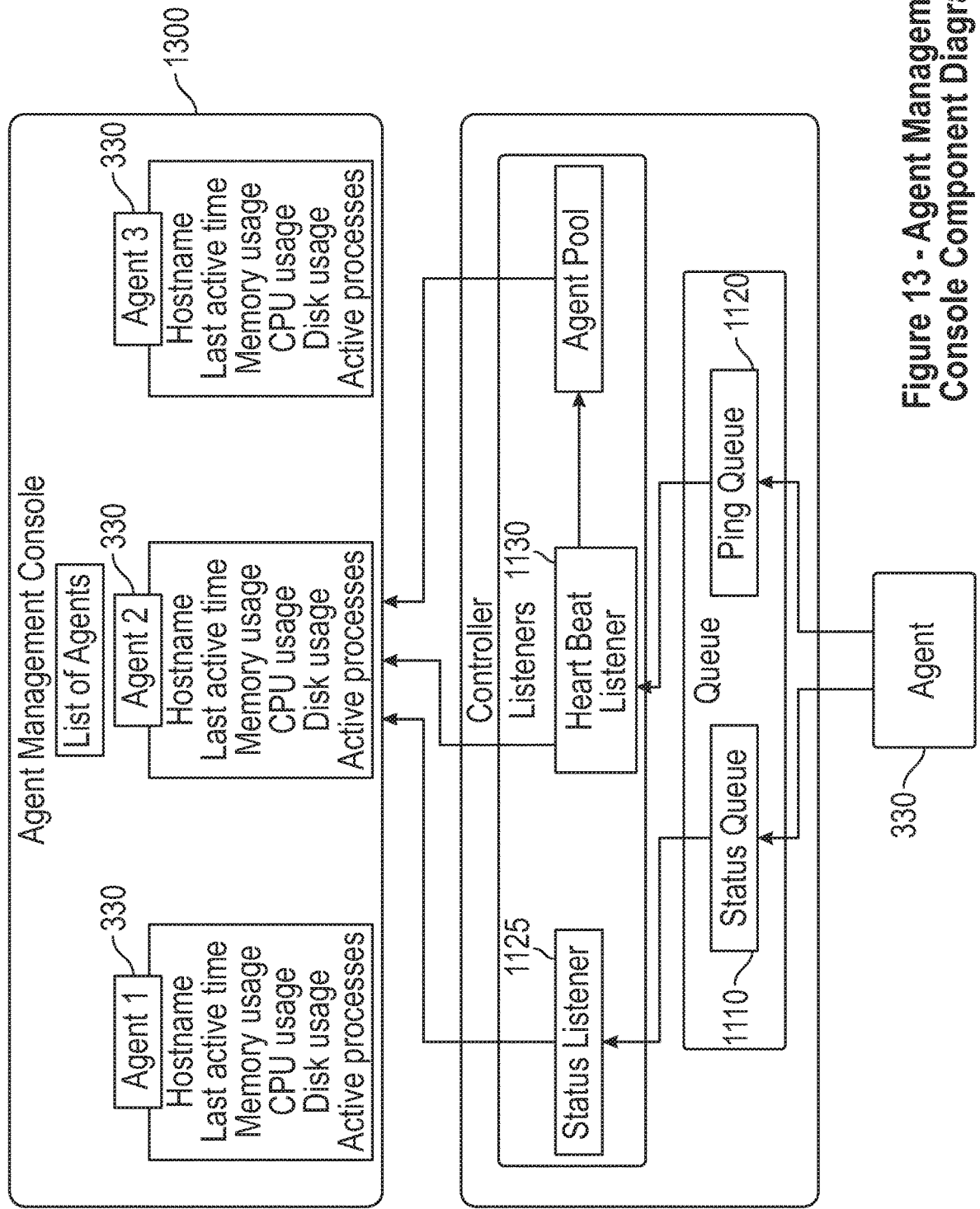
Figure 13 - Agent Management Console Component Diagram

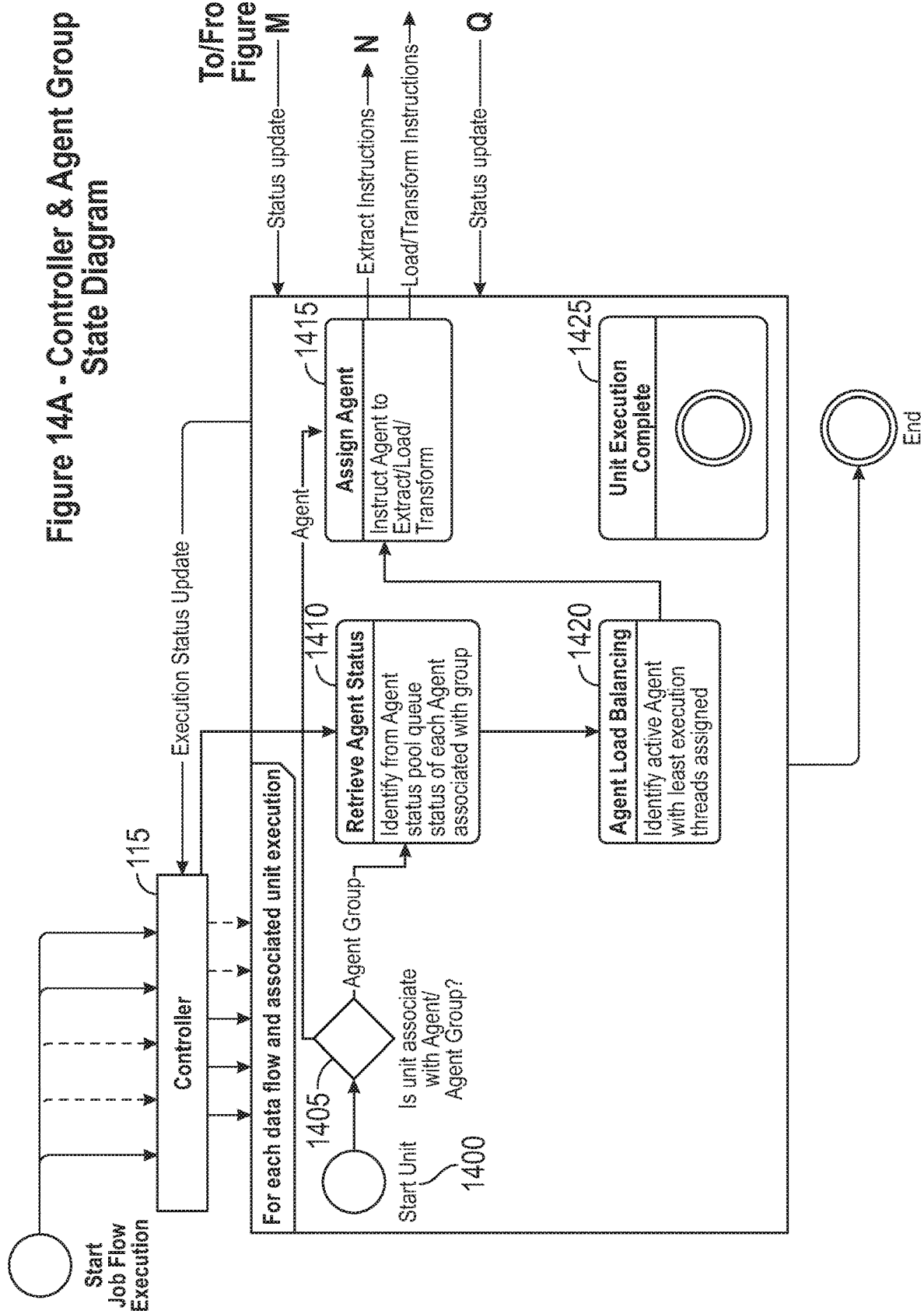

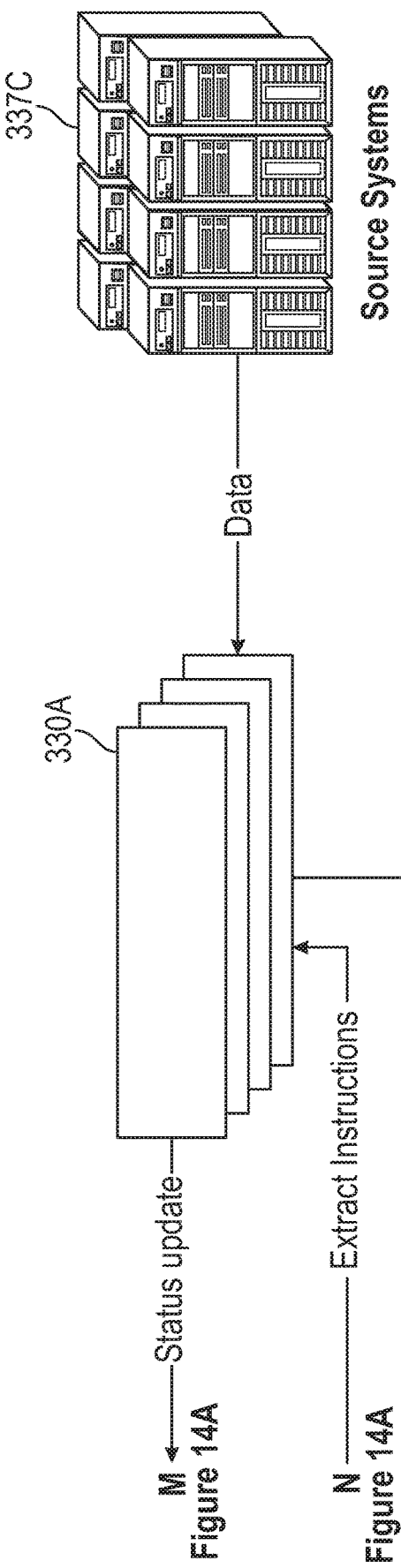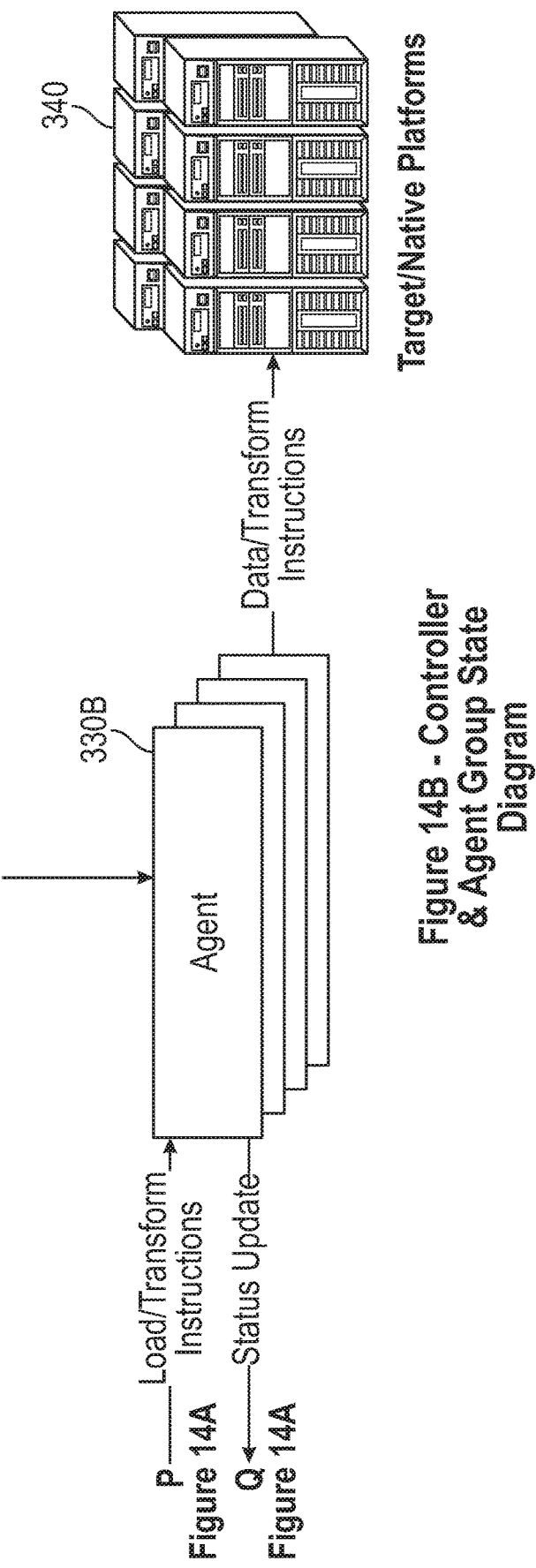
Figure 14B - Controller & Agent Group State Diagram

DATA INTEGRATION FOR DISTRIBUTED AND MASSIVELY PARALLEL PROCESSING ENVIRONMENTS

RELATED APPLICATION

The present application is a U.S. National Stage entry of PCT Application No. PCT/US2018/031220, filed 4 May 2018, which claims priority to U.S. provisional patent application No. 62/502,594 filed 5 May 2017, each of which is incorporated herein by reference in its entirety.

BACKGROUND

Field of the Invention

The present invention relates generally to data integration in either distributed or massively parallel processing environments, and, in one aspect, more particularly relates to interactive development of extract, load and transform data flows while, in another aspect, relates to the use of geographically dispersed agents to simplify extract, load and transform processes with enhanced security and improved data compression.

Related Art

More and more, data analysts require the use of data outside the control of their own organizations. Greatly increasing amounts of data available via the Web, new technologies for linking data across datasets, and an increasing need to integrate structured and unstructured data all drive this trend. While such data is often referred to as "Big Data", the diversity of sources for these heterogeneous datasets, both structured and unstructured, lend themselves to the term "Broad Data" in addition to being "Big Data."

While Big Data applications historically developed either within large companies that had significant archives of their own, or the data came at relatively high data rates and sizes, more recently big data applications involve data distributed much more broadly. In some instances, for example, the data can be the result of a distributed project such as research conducted at a variety of geographically or logically disparate locations. Conventional approaches for handling such diverse datasets have increasingly involved such research communities developing controlled vocabularies and/or ontologies as well as metadata standards to help with data integration. In other instances, companies are increasingly looking at how they might integrate their structured data holdings with those of others and to explore links to both internal and external unstructured data sources. This is especially true for nonprofits, small companies, and others trying to get a benefit from big data where access to data outside their own control is even more crucial.

Having the ability to integrate massive amounts of data available from diverse datasets, catalogs, domains, and cultures can provide data users with the ability to find, access, integrate, and analyze combinations of datasets specific to their needs in ways not previously possible. However, traditional database techniques have not generally focused on the challenges that result from trying to mine data from large repositories that are not organized for such searching, for linking what is found to other data, or for reusing and repurposing the data without massive effort. Most "big data" analytics to date have assumed known data structures and organized data systems, where the dataset has been carefully curated and cleaned.

These traditional assumptions simply do not apply to many types of unstructured data, and those traditional techniques have given way to search engines and metadata-based tools. More sophisticated language and metadata-markup tools are becoming available for searching document sets. Network and social media analytics that constitute the bulk of "big data" projects at search and social media companies are largely powered by these technologies, harnessing a combination of language tools with learning based on the dynamics of users' interactions.

An increasing number of challenges are not amenable to solution by these conventional techniques. In many instances, significant conflict exists between retrieval and precision, both of which relate to relevance, and metrics based on precision and recall can have different meaning depending upon the tools and context. This conflict is magnified when the objective is to apply data analytics to unstructured or diversely structured datasets. While sufficient data integration can overcome at least some of this conflict, conventional approaches to such data integration typically result in unworkable complexity and a lack of transparency that hinders or prevents successful debugging of transformation logic. The result is that attempts at efficient integration of large datasets from diverse sources has been largely unsuccessful.

Further, data integration has typically involved moving large amounts of data across relatively long distances. Given the confidential and proprietary nature of such data, these movements have historically run the risk of exposing confidential information to third parties. While various encryption techniques have been used, the challenges of encrypting large data sets for transmission across long distances can be daunting. Compression techniques have been used in the past, but again the challenges can become daunting because of the volume of compression typically needed and the security risks involved concerning both privacy and confidentiality.

As a result, there has been a long-felt need for systems and methods for large-scale data integration that permits the user to understand the impact of the user's transformation rules and provides transparency in a manner that permits efficient and effective development of job flows, unit flows, and their debugging.

In addition, there has also been a long felt need for systems and methods for large scale data integration that permit faster, more reliable, and more secure data throughput resulting from one or more of distributed, remote processing proximate to the data sources, data compression, data encryption, and direct communication from remote sources to one or more remote targets to reduce system latency, reduce bandwidth requirements, and minimize the exposure of raw data.

Therefore, what is needed is a system and method that overcomes these significant problems found in the conventional systems as described above.

SUMMARY

The present invention overcomes many of the limitations of the prior art. In particular, embodiments of the present invention provide a user interface and supporting data integration structure and process that enables a user to build set-based transformation rules for integrating data from a plurality of sources and to understand, from a display of the resulting data, the outcome of at least some of the transformation rules as each such rule is applied. Thus, for a data integration implementation that involves, for example, three transformations from two sources, the data integration techniques of the present invention can allow a display of the resulting data as the first transformation rule is applied, and again as the third transformation rule is applied. If desired, a display is possible upon application of each transformation rule. A transformation unit can aggregate a plurality of transformation rules, and multiple transformation units can be developed to achieve a desired large scale data integration.

Further, the system of the present invention permits the user, when changing an upstream transformation rule, to display a preview of the data results from all dependent or down-stream transformations. For example, a modification of the logic on a first transformation unit causes a change in the data output in a third, downstream transformation. In an embodiment, the user modifying one or more rules of the first transformation unit can display a preview of the data resulting from the third transformation rule. Further, the volume of a sample can be selected, and the data generated for preview can be preserved in memory or disk, depending on user preference.

In an embodiment of another aspect of the present invention, stateless agents, like the controller a software application, under the control of one or more central controller components are implemented to assist in extracting, loading and transforming data in a highly distributed network of data systems, which include both data sources and data targets. By distributing the agents proximate to the data sources, for example on the same server farm as the source or a server farm near the source, the agents can perform not only extract/load/transform operations close the source. In addition, agents proximate to the source can also encrypt and compress data in accordance with metadata instructions established by the user, resulting in substantially less risk of exposure of confidential data. Further, agents at a data source can transfer data directly to agents at a data target, including, in some embodiments, compression and encryption, rather than having to pass the data through a central processing point. These benefits result in increased speed and efficiency for the overall data integration scheme without requiring that all data be kept in a single repository. The metadata rules can be maintained in any convenient location accessible by one or more controller components. Multiple agents can be implemented within a single server farm to service a single large data source, to permit load balancing for further increased efficiency.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which:

FIG. 1A illustrates the data integration environment in which the present invention operates.

FIG. 1D illustrates in block diagram form the interrelationships of the software modules of an embodiment of the data integration suite of the present invention.

FIG. 2 illustrates in block diagram form the hardware and network structure of an embodiment of the data integration system of the present invention.

FIGS. 3A-3B illustrate in block diagram form an embodiment of the software components of the data integration suite of an aspect of the present invention.

FIG. 4 illustrates an embodiment of a metadata design state diagram of data point management in accordance with the present invention.

FIG. 5 illustrates an embodiment of a metadata design state diagram of data object management in accordance with the present invention.

FIG. 6 illustrates an embodiment of a metadata design state diagram of data flow management in accordance with the present invention.

FIG. 7 illustrates in state diagram form an exemplary data flow process for computing the data for an active transformation, generating a result set, and presenting the result to a browser data window.

FIGS. 8A-8B illustrate an interactive design state diagram illustrating data flow among the various modules in accordance with the present invention.

FIG. 9 illustrates an embodiment of a metadata design state diagram of job flow in accordance with the invention.

FIGS. 10A-10C illustrate an embodiment of an execution state diagram for job flow in accordance with the invention.

FIG. 11 illustrates in block diagram form the interrelationship of the modules of controller and agent in accordance with an embodiment of the present invention.

FIGS. 12A-12B illustrate a controller and agent state diagram in accordance with an embodiment an aspect of the present invention.

FIG. 13 illustrates an agent management console component diagram in accordance with an embodiment of the present invention.

FIGS. 14A-14B illustrate in state diagram form an embodiment of the interactions of the controller and an agent group.

In the following description, like elements will in at least some cases be described with the same reference numerals for multiple figures for the sake of consistency and clarity.

DETAILED DESCRIPTION

Figure 1B:
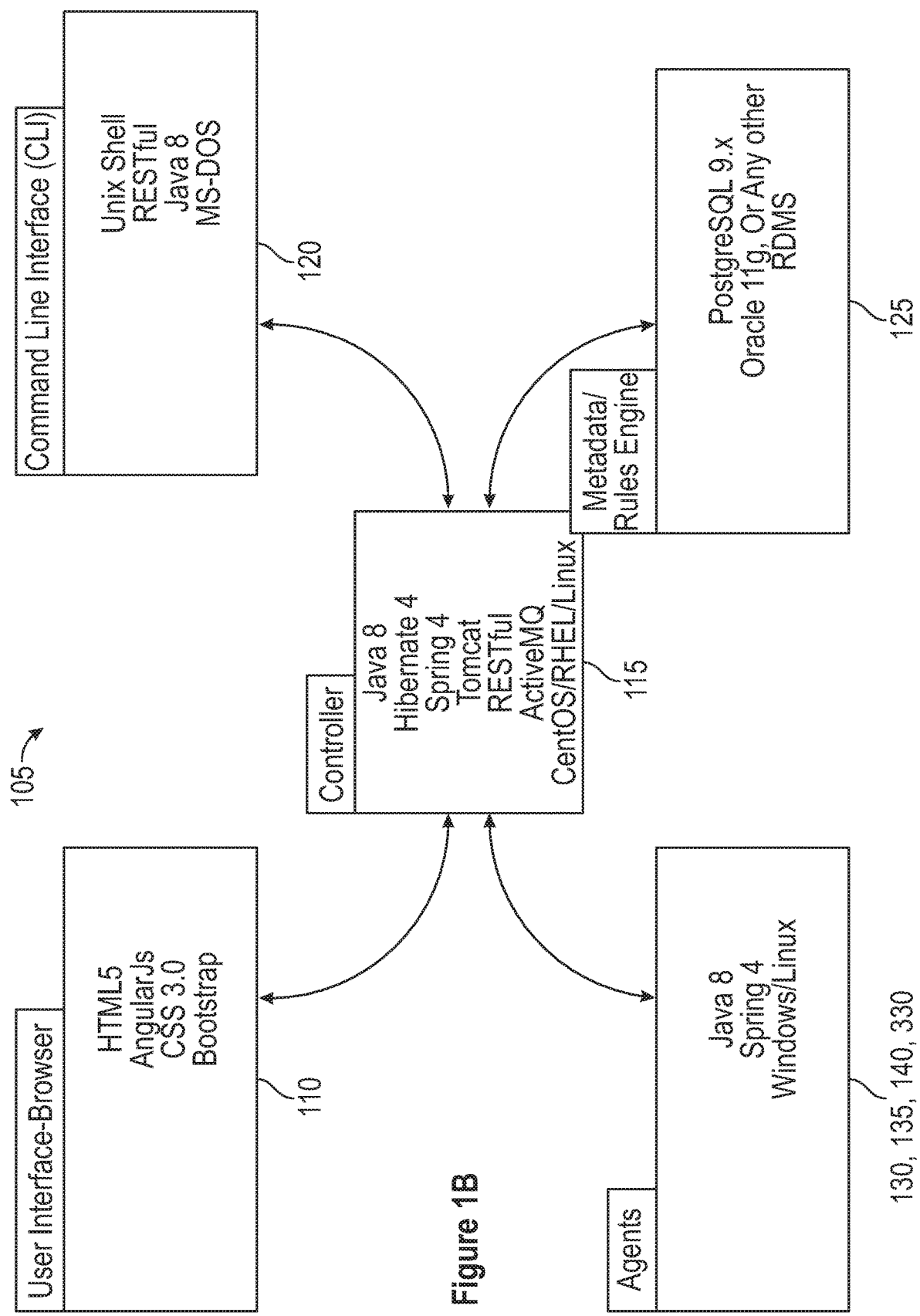
FIG. 1B illustrates at a high level the interaction of a distributed network of agents under the management of one or more controllers in accordance with an embodiment of the present invention.

Referring first to FIG. 1A, an embodiment of the environment 100 in which the present data integration invention operates can be better appreciated. As will be appreciated in greater detail hereinafter, data integration in accordance with the present invention comprises two related aspects: in a first aspect, a job flow must be developed based on the particular data which a user seeks to integrate, taking into account the sources of the data, their formats, and their geographical location, among other things. The development of a job flow involves development of a data flow for each such source, typically involving one or more extract/load/transform (sometimes "E/L/T" hereinafter) functions, together with any necessary E/L/T functions appropriate to move the data or results to a target. Then, in a second aspect, following the development of a job flow, the data integration job must execute efficiently, taking into account appropriate security, audit, and other data transfer concerns. Each of these aspects operates under the control of a data integration suite, shown generally at 105 in FIG. 1A. The data integration suite 105 comprises a user interface 110, a controller 115, a command line interface 120, a metadata/rules engine 125, and one or more agents, indicated at 130, 135 and 140. Under the direction of the controller 115 and based on the metadata in the engine 125, one or more first agents, indicated at 130, perform specified extract, load and/or transform functions on the data selected from any of several sources 145. In some embodiments, one or more other agents, indicated at 135, directs to a processing engine 150 the transfer of all or a portion of the data or the results received from the agents. The processing engine is typically user-designated, and is typically a massively parallel processing platform such as Hive, Spark, Impala, BigSQL, Netezza, Teradata, Hawq, or similar. The processing engine performs further user-specified transforms as specified by metadata instructions maintained in the metadata repository 125, after which the resulting data can be provisioned by one or more agents 140 for use by downstream applications 155 such an analytics 160 or other downstream systems 165.

Referring next to FIG. 1B, the general interrelationships of the software modules of an embodiment of the present invention can be better appreciated. In particular, the modules of an embodiment of the data integration suite 105 can be seen to comprise a user interface 110 which communicates bi-directionally with a controller module 115 configured as an application server. Depending upon the implementation, the user interface 110 can comprise a browser with a user interface written in any convenient manner, such as with HTML5, AngularJS, CSS 3.0, Bootstrap, and so on. During the data integration development phase, the user interface allows the user to define or edit the specific E/L/T functions that form the units of a job flow and to test the data flow as it is being developed, including the ability to see a visual display of the results. During the execution phase, the user interface provides the user the ability to login and select for execution a previously stored job flow. The controller module 115 can be written in any suitable language, such as Java 8, Hibernate 4, Spring 4, Tomcat, RESTful, Node.js, ActiveMQ, or CentOS/RHEL/Linus, among others.

The controller module 115 also communicates with a command line interface ("CLI") module 120 in a conventional manner. The CLI can be written in any convenient language, such as a Linux shell, RESTful, Java 8 or MS-DOS. In addition, the controller module 115 communicates with one or more Agent Module 130, 135, 140 and a Metadata/Rules Engine Module 125. The Agent Module(s) 130, 135, 140 are each an application and respond to metadata instructions from the Controller Module to perform Extract/Load/Transform functions, and can be written in any convenient language such as Java 8, Spring 4, or Windows/Linux. The Metadata/Rules Engine module 125 is essentially a database that serves as a repository for storing the metadata instructions that form a job flow and its component data flows, as well as various types of system data, as explained further in connection with FIG. 3. The metadata/rules engine 125 can be written in, for example, PostgreSQL 9.x or Oracle 1 g or other convenient language.

Figure 1C:
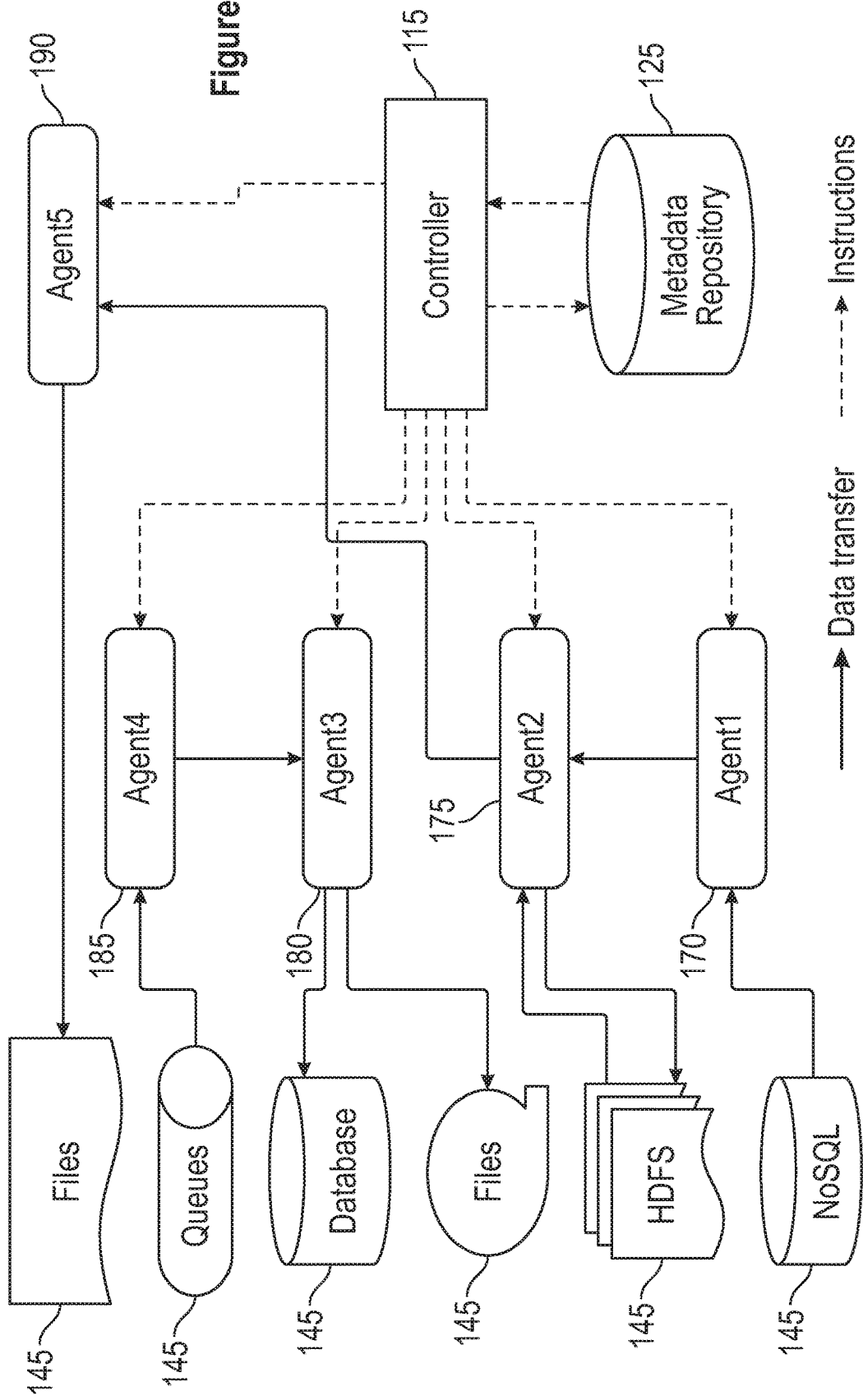
FIG. 1C illustrates in block diagram form a variety of types of data sources that can be accessed in at least some embodiments of the present invention.

FIG. 1C shows in block diagram form the relationship among the components of the data integration suite together with the network of diverse data systems, indicated generally at 145, where the distributed deployment of a plurality of agents 170-190 permits efficient E/L/T functions to be performed. As will be appreciated in greater detail hereinafter, the agents can be distributed over a wide geographic area, such as multiple locations around the globe, and are typically implemented in a server reasonably proximate to a data source or target, which helps to provide improved security and to reduce the volume of data that needs to be transported for further integration or subsequent analytics. During the development of a job flow using the data integration suite described hereinafter, the controller 115 stores in repository 125 metadata instructions for extract/load/transform actions to be performed by the agents associated with each of the data sources, as more fully seen in FIG. 1D et seq. During execution of a job flow, the controller retrieves those user-defined metadata instructions from repository 125 in accordance with which E/L/T instructions are issued to agents 170-190. In an embodiment, the agents are configurable to perform any of a plurality of functions, including the afore-mentioned extract, load and transform tasks. The agents are configured to communicate to any of the associated data source/target, the controller, or directly to another agent, as defined by the metadata instructions that comprise the job flow. For security, in at least some embodiments the metadata includes instructions to encrypt and compress the data and also to audit the transfer of the process. The controller also manages the configuration of each agent as well as monitoring each agents 'heartbeat'.

FIG. 1D illustrates in greater detail a network diagram showing the distributed nature of the agents and data sources/targets with respect to the controller, the associated user interface, and the metadata repository. In an embodiment, secure TCP/IP links are used for the communications among the various components of FIG. 1D, to avoid exposing the data or associated analytics unnecessarily, although not all, or even any, of such precautions are necessary in every implementation. The user accesses the controller 115 through the user interface 110, which may, for example, be implemented on a laptop or other suitable processor-based device. In the illustrated example, the controller 115 is hosted on one or more servers 131 within a server farm in Northern Virginia. For simplicity, the metadata repository 125 is not shown in FIG. 1D, but is also typically hosted on the same server farm, and perhaps the same server, as the controller 115. Those skilled in the art will appreciate that, in many implementations, the repository can be located elsewhere as long as the communications link between the controller and the repository is adequate for the desired throughput. The controller 115 sends metadata instructions to agents 133A-133D, each of which is typically deployed on a server that is logically if not physically proximate to an associated data source or data target 137A-137D. The data source or data target are typically deployed on server farms that can be located far from one another, as suggested by the examples shown in FIG. 1D, where one data source is shown as Mexico City, another as Johannesburg, a data source/target is shown as San Francisco, and finally another data source/target shown as Munich. The ability to manage such geographically diverse sources and targets is a desirable feature of at least some embodiments of the present invention.

As discussed in greater detail hereinafter, the metadata instructions from the controller cause the agent applications to execute E/L/T functions on the data at associated data platform. In the example illustrated in FIG. 1D, agents 133A and 133C each send "extract" instructions to associated data platforms 137A and 137C, while agents 133B and 133D send "load" and "transform" instructions to associated data platforms 137B and 137D. Each of the agents 137A-D responds to the controller with a status report comprising that agent's response to the E/L/T instruction it received from the controller. It will be appreciated by those skilled in the art that each of the data platforms 137A-137D, where each data platform can serve as a data source, a data target, or both, depending on what data is to be integrated and to what purpose. It will also be appreciated that the agents can send data directly to another agent, thus reducing latency in data transmissions and avoiding bottlenecks at the controller. In addition to using secure TCP/IP connections, in at least some embodiments the agents encrypt and compress the data being extracted from a data platform and sent out, or decrypt and decompress the information being received from elsewhere and forwarded to their associated data platform.

FIG. 2 shows an exemplary embodiment of the network hardware configuration on which the data integration system of the present invention. Client access is provided via a browser-compatible terminal 200 that hosts the User Interface module 105 and can be, for example, a personal computer running any convenient browser such as Internet Explorer 11.x or later, Google Chrome, Mozilla Firefox, etc., with a CPU configuration such as, for example, a pair of Intel Xeon CPU ES-2620 processors, or other dual core or better, with four or more gigabytes of memory, and an internet-capable network connection. The client access terminal 200 communicates with a controller 205 via HTTP/HTTPS or other convenient protocol. The controller 205 hosts the controller module 110 and command line interface module 115, and, in some embodiments, also hosts at least one agent application and can also host an embedded repository. The hardware configuration of the controller 205 can be, for example, a server having a pair of Intel Xeon ES-2620 processors, dual core or higher, with four gigabytes of RAM or more, and at least ten gigabytes of disk storage together with a gigabit network connection. The operating system for the controller can be any suitable OS, such as Linux, RHEL, Oracle Linux, or Centos Linux 6.1 or later along with Java 1.8x or later, Tomcat 7.0.37 or later, and AngularJS 1.x or later.

In some embodiments, agents are embedded in the controller 205, while in other embodiments the agents are hosted on their own systems 210 similar in configuration to the controller although preferably with six gigabytes or more of memory, and in some cases Microsoft Windows is an acceptable operating system. In at least some embodiments, the agents communicate with the controller over a secure TCP/IP connection. A metadata repository 215 can be embedded in the controller system, or can be a separate device coupled to the controller in any convenient manner such as secure TCP/IP. Typical storage requirements for at least some embodiments can be two gigabytes or greater, and database software can be Oracle 11.x or Postgres 9.x and later versions or other suitable programs. A user 220 interacts with the system through the client access terminal 200 and the command line interface 120 hosted on the controller 205.

FIGS. 3A-3B illustrate in greater detail the software components of the data integration suite of the present invention. As noted previously, these components operate on and control the network hardware of FIG. 2. The User Interface 110 (FIG. 1) can be seen to comprise three functional areas: Application Administration 300, Data Management 305, and Job Monitoring 310. In an embodiment, Application Administration comprises the tasks of managing users, user access, user security, software license, project, agent configuration and controller and agent log configuration, as well as the agent management console. Data Management comprises managing user-defined connections, data objects (tables, JSON, XML and file definitions), as well as building the metadata rules for the extract, load and transform functions performed on the data. In addition, data management comprises workflow management, workflow scheduling, impact analysis and maintaining data lineage. The Data Management module provides an interactive design capability that enables debugging of the metadata while design rules for handling the integration of the data, as described in greater detail hereinafter. The Job Monitoring module manages job flow monitoring, run and re-start of jobs, debugging of failed jobs, operational statistics and an operational dashboard.

The command line interface module 120 permits the user 220 to enter commands relating to job flow, import and export of metadata, and backup and recovery of metadata. Both the User Interface 110 and the Command Line Interface are accessed by user 220.

The controller 115 comprises three major groups of functionality: a Service Manager module, a Rule Compilation Engine, and an Execution Engine. The Service Manager manages requests from all clients including browser modules, the CLI, the Scheduler and the Agents. It also manages metadata requests from the client modules, which can take the form of delete/update/insert. Further, the controller manages validation of user-defined rules and provides guidance on the design rules. Still further, the controller provides metadata search functionality and builds metadata assets as required for providing data lineage. The controller receives commands from the CLI 120, and exchanges metadata instructions with the User Interface 110.

The Rule Compilation Engine 320 of the Controller 115 prepares platform-specific instructions for implementing the extract and transform rules specified by the user. It also manages unit level platform instructions and serves requests from the Service Manager module 315 and the Execution Engine module 325.

The Metadata Repository and Rules Store 125 stores metadata for users, security, projects and agents configurations, as well as data object metadata, rules for Extract, Load and Transform functions. In addition, the repository 125 stores platform-specific compiled instructions, operational statistics, and log information. The repository exchanges data with and receives instructions from the controller 115, including design and compilation metadata as well as operational metadata.

The controller 115 also exchanges metadata instructions with one or more Agents 330, shown in FIG. 3B (connecting points A and B). In addition, data can flow back from the agents to the controller in instances where a user requests to view the data at a client. The agents are applications that receive metadata instructions from the controller. The instructions can cause one or more agents either: (1) to extract data from an associated source or sources 335, in accordance with the rules specified; (2) transfer extracted data directly to a target platform 340 or else to another agent; (3) provide to either or both of the source and the target platform transform instructions as received from the controller 115. In at least some embodiments, and depending upon the rules received from the controller, the data is encrypted and compressed before sending to another agent. The data sources 335 comprise one or more of cloud source, databases, files, and so on as shown in FIGS. 1A-1B, and can take any suitable form. The target platform 340 is typically a massively parallel processing platform, or processing engine as shown at 150 in FIG. 1A, such as Hadoop, Spark, Teradata, Netezza, Greenplum, Amazon Redshift, Apache Ignite, Oracle, Exadata, and other similar platforms.

With the foregoing general description of the components that comprise the data integration suite and its operating environment, the operation of the invention to achieve data integration can be better appreciated. As shown beginning with FIG. 4, in an embodiment the process of integrating large volumes of heterogeneous data from multiple sources in accordance with the invention begins with a user 400 logging into the system via UI 405 and creating a metadata user request, shown at 410. The metadata requests can vary in purpose, depending on the objective of the metadata. Typical metadata comprises selection of source and target data points, data objects, data flows, job flows, and schedules. In general, for a new project, the first steps will involve choosing one or more data points; that is, choosing one or more sources of data for integration.

If the Request 410 is to create new metadata, the process branches at 420 and, as shown at 425, the user selects the type of data point from the choices available. The process advances to 430, where a data point is created for the specific source chosen. In an embodiment, the data point comprises several fields, including data point name, type, host, port, agent, and other properties. Once the data point is sufficiently characterized, i.e., at least the key fields are populated, the connection to the controller 115 is tested. In some embodiments all fields must be populated. The controller forwards the connection test to the selected agent 440, which in turn attempts to link (445) to the source and target data platforms, shown collectively at 340, designated in the data point fields. Tests can be conducted for both sources and targets. If the test succeeds in linking to the source and the target, the data point is considered valid and a save instruction 450 is sent to the controller 115, which in turn sends the now-successful data point to the metadata repository 125 together with a save instruction, as indicated at 445.

If the user's objective is to modify a data point, rather than create one, the user enters the data point name at 410 and the process branches as shown at 420 to an editor step 460. The previously-saved data point is retrieved from the repository 125 by means of a retrieve message 465 to the controller 115 and a retrieve instruction 470 sent to the repository 125, such that the data point is ultimately displayed at the client terminal or other suitable device, for example a smart phone, for the user to edit. Once the editing is complete, the edited data point is tested as shown at 475, 440 and 445. If the tests are successful, the edited data point can be saved by a message at 465 and a save instruction to the repository 125. If multiple data points are to be created or modified, the process is repeated iteratively as long as necessary.

Continuing the development of integration metadata, following the successful creation of a data point within the system of the present invention, the user typically selects one or more data objects. One embodiment of such a process is shown in FIG. 5. As with FIG. 4, the user logs in and initiates a Create/Modify Metadata User Request, this time for a data object as selected at 415. At 420, to create a new data object the process branches to manually choose the type of data object to create from among the various sources, shown at 500, where the choice is typically the same as the data point. The newly-created data object comprises a plurality of attribute and property fields to be populated in order to fully characterize the object. The data object attributes and properties can comprise the data object name, the data object type, and such other attributes and properties as appropriate for the particular integration. When complete, a "save" message 510 is sent to the controller which initiates a "save data object" instruction as shown at 513.

In some instances, such as modifying a data object, it will be appropriate to import the metadata for an existing data point, as shown at 515 which forms the second branch of 420. The metadata is then retrieved from the source or target data platform 340, or, for file-based sources/targets, a schema can be provided from a client, shown at 520. The retrieved schema/table/file metadata is provided to the appropriate agent 330, and then to the controller 115 as shown at 525. As shown at 530, the controller forwards a list of data points to a selection step 535, and the process advances to step 540 where the user selects a Tables/Files/Schema definition for file-based data objects. The controller provides at least the relevant Schema/Table/File metadata to enable the selection, shown at 545. The data points list is typically provided by the repository 125 in response to an instruction from the controller 115, shown at 550 and 555, respectively.

Once the selection is made, the process advances to step 505 where the user is able to modify or create (depending on context) the data object. If a specific data object is being modified, it is first retrieved from the repository 125 by means of an instruction from the controller 115 and a retrieval message 560. When the attributes and properties of the selected data object are sufficiently if not fully populated to permit a save, the user can cause a save message to be sent to the controller in which case the data object is saved to the repository as shown at 513. If multiple data objects are to be created or modified, the process is repeated iteratively as long as necessary.

Following the selection of at least one data point and an associated data object, creating a data flow is a logical next step. An embodiment of such a process in accordance with the invention is shown in FIG. 6, which also illustrates editing an existing data flow. To create a new data flow, the user logs in a selects Create/Modify Metadata User Request 410, selects data flow at 415, and selects create at 420. This advances to step 600, where the user selects a data point that supports native processing from among those available. Typical choices include Hadoop, Netezza, Teradata, and so on. Available data points 605 are retrieved from the repository 125 via instructions from the controller 115 in the same manner as described above.

Using Hadoop for purposes of example, once the data objects are selected for both source and target, the process advances to step 610 where a data flow is either created or modified. Creating a workflow is selected first for purposes of example. As shown at 615, for each data flow the user provides the source, transformation rules, and load to target rules based on the user's business requirements. An instance of each selected source data object, shown at 620A-B, is presented to the user, who selects operations from those available within that native processing environment, as shown at 625. For the example shown in FIG. 6, two operations, Joiner and Aggregation, are selected as indicated at 630 and 635, respectively. Based on the selection of the data point at 600, a list of functions available for that platform is displayed on an expressions editor for the user's selection, indicated at 640. The output of the sequential transformations 630 and 635 is then provided, along with data objects 605, to a target data object instance, shown at 645. Once the functions for each operation on each data object are selected, the data flow can be saved in a manner similar to that discussed for data points and data objects, and as indicated at 650. The data flow being developed is in the memory unless it is saved, at which time the details are stored in the metadata repository. Modification of an existing dataflow operates in a very similar way to the modification of data points and data objects, including particularly the retrieval of one or more data flows from the repository 125.

With the foregoing discussion of data points, data objects and data flows in mind, the interactive software components of the present invention can be appreciated. In particular, one important aspect of the present invention is the ability for the user developing the integration to see a visual display on the client device of the result achieved by each applied transformation. In an interactive development with the present invention, as the data flow is being developed, the data window of any transformation shows the preview of the transformed data. The state diagram of FIG. 7 illustrates an embodiment of that interaction. A browser UI 110 displays a data flow 700 in a data window 705. An object of data flow 710 is stored in browser memory 715 along with variables reflecting the last update timestamp 720 and the last compile timestamp 725 of the data flow, all as indicated at 730. Thereafter, the browser submits REST calls to send the data flow object generated at that instant of time when the data window 705 is activated for the transformation to the controller 115. The browser also sends the transformation ID 735 for which the data window is active, all indicated at 740.

The compilation engine 745 then compiles the SQLs 750 required to compute the data for the active transformation and, via the service layer 755, submits them to the agent 330, as indicated at 760. As indicated at 765, the agent 330 submits the SQL's to the native database 770, which causes the database to generate a result set. The native database is typically a Hadoop platform or massively parallel processing platform, and is where the transformations, designed as part of the data flow of the present invention, are executed. In the example of FIG. 7, the result set is transmitted to the controller 115, as indicated at 775, and then provided to the browser data window for display to the user, shown at 780.

Stated more generally, when the data flow needs to be executed from a job flow, the controller 115 extracts the data stored for that data flow from the metadata and sends the data flow object to the compiler engine 745. The compiler engine prepares the SQL in accordance with the semantics of the native platform. Based on the dependencies between the transformations of the data flow, the compiled SQLs are submitted in that order of dependency to the agent 330, which then submits the SQL's to the native platform for execution.

The interactive features of FIG. 7 combine with the data flow characteristics of FIG. 6 to illustrate how the present invention provides to the user a preview of the data undergoing transformation at each step of the transformation. This can be better appreciated from FIG. 8A, which depicts in state diagram form the interactive design of data flow of the present invention. The data flow of FIG. 8A is similar to that shown in FIG. 6, and like numerals have been used for like substantially similar elements. FIG. 8A differs from FIG. 6 in part with the addition of a Unit Data Viewer 805, which coordinates viewing the data in each transformation unit 620A-B, 630, 635 and 645, and Unit Data Viewers 810-830, which correspond in order to their respective transformation unit. Then, FIG. 8B, which connects to FIG. 8A at point E from data flow module 610, provides the structure by which, during an interactive development, as the data flow is being developed, the data window of any transformation shows the preview of the transformed data. By providing such visual and immediate feedback, a developer can quickly tell whether a transformation achieved the intended result. Likewise, a failed result is immediately obvious, and the developer can focus directly on the transformation that caused the failure, rather than the prior art approach of running the transformations in what is effectively 'batch' mode, and then having to review each transformation manually until the defect is found.

The operation of an embodiment of the data viewer in accordance with the invention, as shown in FIG. 8B, begins at 835, after which a check is made at 840 to determine whether any upstream units exist. If yes, a check is made at 845 to determine whether any current or upstream units have been modified since the last timestamp. If yes again, the upstream unit(s) are compiled at 850 after which the upstream and current units are executed in order, 855 and 860, to create staged data files/tables that accurately represent normal operation of the transformations. Once all of the upstream units and the current unit have been compiled and executed, the process exits. The compile and execute functions are performed under the direction of the controller, which receives unit compile and unit execution requests from the data viewer and in turn sends instructions to the source and target agents, indicated at 865A-C, respectively, to cause the extraction of the relevant data from the Sources indicated at 870A-B and the loading of the relevant data to the target platform 875. If there are no upstream units, the check at 840 will yield a NO, and the process then queries at 875 whether the current unit has been modified since the last timestamp. If the answer is yes, the current unit is compiled as shown at 850 and then executed as shown at 860. If the current unit has not been modified, or if the check at 845 returned a no, indicating that no upstream units had been modified since the last timestamp, the process advances to 880 where a check is made to determine if the data for the upstream and current units has been persisted. If yes, then the process exits at 885. If no, the upstream and current units are executed as shown at 855 and 860, in order, and the process then exits at 885. It can thus be appreciated that, for each attempt to view the data during interactive development, the present invention ensures that all transformations are performed in proper sequence, to ensure data integrity. Thus, when the user selects the data window for any transformation under development, the data shown reflects the impact of all upstream transformation as well as the transformation performed by the current unit.

Depending upon the embodiment, on clicking the data window for a transformation, the compiler engine is sent with the data flow object at that instance from the browser memory. For that transformation, the compiler engine generates the SQL and sends it to the agent for execution. If data persistence for transformation is enabled then, the result from the SQL is stored in a table in the native processing platform's database referred to as the TFORM (transform) database. The database choice is for the user. The result data in the UI is produced from running a select query on the transform database table. If data persistence is not enabled, the result of the transformation query is rendered directly to UI without storing into a table. The last execution time of the SQL is stored in memory for each unit. On clicking data window, the time of last change to the transformation and the execution time is compared. If the time of last change is later to the execution time, the SQL query is executed again to produce the updated data as per the change. When switching between one transformation window to another, if the data window was already populated with data from an earlier preparation of preview, the same is stored in memory to avoid replaying the same query to the data platform again. This is only when there is no change in the transformation. When populating the data window from a source in data flow, if the source is external to the native platform the data is extracted from the source platform and stored in a Transform (TFORM) table stored in the native platform's database.

Referring next to FIGS. 9 and 10A-10C, the design and execution of a job flow can be better appreciated. Starting with FIG. 9, which is a state diagram describing the metadata design of a job flow, the process starts in a manner similar to selection of data points, data objects, and data flow, as shown at 400, 405, 410, 415 and 420. That advances the process to 900, which provides the option to create or modify a job flow, and incorporates user-specified source(s), transformation rules, and load to target rules based on business requirements. Data flows are retrieved from the repository 125 via the controller 115 and supplied to a list of choices, indicated at 910. The selected data flows 915 and 920 are added to the Job Flow module 900. Then, available job types are selected from a list indicated at 925. Depending on the job type, the selected job is either performed on success of a prior job, failure of a prior job, or regardless of the success/failure of the prior job. The jobs may be performed sequentially on different sources, as shown at 915 and 920 where 915 uses Teradata as a source while 920 uses Hadoop as a source. For example, the job indicated at 930 is shown as proceeding on a Linux process platform regardless of the success/failure of the job indicated at 915. Likewise, the job 935 proceeds on the output of jobs 920 and 930 regardless of their respective outcomes. The dataset generated by the job flow can be saved in the native database.

FIGS. 10A-10C show in state diagram form an embodiment of the run-time execution of a job flow developed in accordance with FIG. 9. FIG. 10A illustrates more generally the execution of a job flow across multiple agents 330A-330C and multiple data sources 337A-337C. As seen in FIG. 10A, the user initiates a job flow execution at 1010 by instructing the controller 115 to retrieve a specific job flow, shown at 1015, from the metadata repository 125. At 1020 a check is made to determine whether either the job or any dependent objects have been modified after the previous execution. If so, the job re-compiles as shown at 1023, and the metadata repository 125 is updated accordingly with the new design & compilation metadata. If there have been no modifications since the previous execution, the process advances to step 1000, a list of retrieved job flow details. For each job, the controller then creates one or more task threads as shown at 1003, with the number being appropriate for the number of units within the job. The tasks are then queued as shown at 1005.

For each successive task, Task1 through Taskn, the controller issues metadata E/L/T instructions to one or more of agents 330A-330C as appropriate for the particular task. The agents then execute their specific E/L/T functions by issuing corresponding E/L/T instructions to their associated source data/targets. Thus, agent1 330B can be seen as issuing Extract instructions to the source/native platform deployed on servers 337C, which causes data to be retrieved from the source and transmitted back to the agent. The data is then encrypted and compressed by the agent application, and appropriate portions of the encrypted and compressed data are transmitted directly to agents 330A and 330C. Agent1 330A receives its portion of the encrypted/compressed data and decrypts and decompresses it in accordance with the controller's metadata instructions. Agent1 then transmits the decrypted and decompressed data to the source/native platform on servers 337B and also issues E/L/T instructions as directed by the metadata instructions from the controller 115. The source/native platform performs the E/L/T functions as directed, and responds back to agent1 with the appropriate data.

Agent1 330A then encrypts and compresses the responsive data from the platform on servers 337B, and forwards that encrypted and compressed data to Agent3, 330C. Agent3 330C, in accordance with metadata instructions received from controller 115 and now in receipt of data from both Agent1 330A and Agent2 330B, decrypts and decompresses the data and forwards it to the native platform resident on servers 337B, together with Transform instructions. The native platform on servers 337B perform the transform as directed, and the task completes. As appropriate, status updates for the jobflow, job and unit are stored on the metadata repository 125. The process the repeats for the next task until the last task is of a given Task Thread is completed, after which the process repeats for each additional Task Thread. Finally, after the last task for the last Task Thread in a given job is completed, the process advances to the next job. The operational metadata for the job flow, jobs, and units is updated in the repository 125 as shown at 1027.

FIGS. 10B and 10C can be seen to connect at points R, S, T, U, V and W. In particular, FIGS. 10A and 10B-10C illustrate in greater detail Job flow/Job/Unit threads, and their interdependences that must be taken into account for proper execution. Thus, controller 115 comprises job flow details block 1000 and Thread Queue 1005. Job Flow Details Block shows jobs 915, 920, 930 and 935, also indicated as Jobs J1, J2, J3 and J4, respectively. Job flow execution is initiated from the client module, indicated at 1010. Upon initiation, specific job flow details are retrieved from the metadata repository 125, as indicated at 1015. A check is made at 1020 to determine if the job or any dependent objects have been modified since previous execution. If so, the job flow is compiled and brought current, as indicated at 1023, and the results are reported to the Job Flow Details block 1000. In addition, the compiled, updated jobflow design metadata is stored in the repository 125, from which it can be retrieved in the future for iterations where no interim changes have been made.

The Thread Queue 1005 illustrates an example of the interdependencies that can occur among various jobs. Thus, beginning with Job Flow 1 indicated at 1025, the thread queue first performs job J1, which comprises a single Unit1. Upon completion, the output of J1 is provided to J2 and J2 initiated only if J1 was successful. However, the output of J1 is provided to J3 whether J1 was successful or not. J3 is, again a single unit, and the output of J3 is provided to J4, and J4 initiated, regardless whether J3 is successful or not.

However, J2, which is initialized only if J1 ended successfully, comprises five units with significant interdependencies. Unit 1 of J2, indicated as 920A and also as J2-U1, provides its output to J2-U3, or 920C, but J2-U3 initiates only upon success of J2-U1. Likewise, J2-U2 provides its output to J2-U3, but J2-U3 only initiates if J2-U2 is successful. J2-U4 receives the output of J2-U3, but initiates only if J2-U3 was successful. J2-U4 provides its output to J2-U5, but J2-U5 only initiates if J2-U4 ends in success. However, the final output of J2 is provided to J4 regardless of success or failure. The process ends once Job J4 completes, and the updated operational metadata associated with the job flow/job/unit is stored in the repository 125 as shown at 1027. It will be appreciated that FIG. 10B illustrates the agents 330A-C associated with each of the relevant Sources 340A-C. As with the prior figures discussed hereinabove, the agents receive instructions in connection with each related job, and redirect those instructions to the relevant Sources for execution. Once the data is returned, the agents pass the results back to the controller for further processing.

Referring next to FIG. 11, the relationship between the controller 115 and an agent 330 can be better appreciated. As noted previously, the controller 115 is the main software application of the data integration suite of the present invention. In a typical arrangement, and as noted in connection with FIG. 1C, the controller 115 is installed on a server running a Linux operating system. Further, the controller 115 typically comprises some form of Java Message Oriented Middleware API, such as Apache MQ, as the Java Messenger Service provider running in the controller's host. In an embodiment, the active message queue ActiveMQ, indicated at 1105, comprises a status queue 1110, an agent_name queue 1115 where there is one queue per agent name associated with the controller, and a ping queue 1120. The agent queue produces objects and text messages based on instructions and messages from the controller. The objects are the compiled code that is to be executed on the native database.

Agent applications, indicated at 1150, can also be hosted on a Linux server or other suitable server such as Windows, indicated at 1155. The agent_name listener 1160 listens to the agent_name queue 1115 for its name and receives messages which are then executed against the native database. The status of the executions and results of the executions are produced to the status queue 1110. The status listener component 1125 listens to the status queue 1110 and receives any message sent by an associated agent. The ping queue 1120 receives each agent's heart beat message, typically sent every minute, to ensure up to date information about the health of each agent. The heart beat listener 1130 in the controller receives the same to know whether the agent is active. An agent status pool service 1135 runs in the controller to maintain the status of all agents associated with the controller.

Referring next to FIG. 12A-12B, an embodiment of agent-to-agent data transfers can be better understood, including associated compression and encryption features. FIGS. 12A and 12B connect at the points indicated as J, K, and L. The source establishes connection to the target host using a data receiving port. The metadata of the data transfer process, such as the data file/pipe to be created in the target, and the encryption and compression algorithm to be used, are sent to the target agent, shown at 1250. The target acknowledges after setting up the data receiver 1253, and creates a named pipe as shown at 1255 including a data file name. As discussed in more detail below, once acknowledged by the target, the source starts sending chunks of data over the network to the data receiver in the target. The target starts receiving the data, chunk by chunk, and writes the data to a target file. If encryption or compression is on, the data is first written to a staging file which is the decompressed and decrypted, before writing to a target file. Once the last chunk of data is received, the Target acknowledges completion of the data transfer and closes its resources. Upon receiving the acknowledgement, the source closes its resources.

Referring more specifically to FIGS. 12A-12B, the details of the process described above can be better appreciated. The process starts at 1200, with a user's instruction of a job flow execution to the controller 115. The controller retrieves from the metadata repository 125 the specific unit execution request, which can be specific to unit/type and comprises extract, load or transform metadata as specified in the job flow development phase described above. The specific unit execution request is then routed through a check, 1205, which direct the appropriate metadata to one or more agents, shown as two in the illustrated example. In the example, agent1 1210 is associated with a source and receives extract/load instructions, while agent2 1215 is associated with a target and receives transform instructions which are directed to a transform unit 1217.

The source agent 1210 starts unit execution as shown at 1203, and directs an Extract Data unit 1207 to issue extract metadata instructions to source platforms 1209A-1209B. The responsive data is then transmitted back to the Extract Data unit 1207, after which determinations whether to compress and encrypt the data are made as shown at 1211 and 1213, with the associated compression and encryption units shown at 1217 and 1219. Compression and encryption need not be used in every embodiment, but provide additional security when used. If the encryption option is turned on, the data is encrypted based on an algorithm chosen by the user, as, for example, Payload encryption with Java Advanced Encryption Standard ("AES"), and support for 128, 192 and 256 bit encryption. If compression is turned on the data is compressed based on the user's choice of suitable codecs including, for example, the zlib or gzip codecs. After compression and encryption have been completed, or if no compression or encryption is required, the data is forwarded to a Data Prep unit 1221. If necessary to divide up the data for efficient transmission, the Data Prep unit divides the data file into chunks suitable for transmission on the data pipe that has been established between the source agent and the target agent, typically secure TCP/IP as shown in FIG. 1D.

As noted above, on start-up of target agent 1215, a data receiver socket service such as Netty is also started listening on a port, as shown at 1253. Any number of source agents 1205 can start communicating to the target agent on this socket. The creation of the named pipe at 1255 causes the target agent 1215 to send to a Send Data to Load Agent unit 1223 on the source agent 1210 a message acknowledging that the target is ready to receive data.

Once acknowledged by the target, the source starts sending chunks of data over the network to the data receiver in the target. The process initially performs a check at 1225 to determine if the extract agent is the same at the load agent. If not, the process advances to block 1223, but, if it is, the process loads data to the target platform as shown at 1227 by the issuance of load instructions to write to the target, shown in FIG. 12B. Block 1223 directs the data to the Encrypt block in the target 1215. The target 1215 starts receiving the data, chunk by chunk, and writes the data to a target file 1260. If the source data has been encrypted or compressed, or both, as advised by block 1250, the data is first written to a staging file 1265 and is the decompressed and decrypted, 1270-1275, before writing to the target file 1260. Once the last chunk of data is received, the Target sends to the Source an acknowledgement 1280 of completion of the data transfer and closes its resources. Upon receiving the acknowledgement, the source closes its resources, 1285.

Referring next to FIG. 13, an embodiment of an agent management console 1300 in accordance with the invention can be better appreciated. The agent management console is a component of the user interface, and the operations to support it are provided by the Controller 115. As discussed in connection with FIG. 11, the Controller 115 comprises a ping queue 1120 to which each agent associated with that controller reports its availability. In addition, the controller comprises a status queue 1110. Each agent associated with a particular controller generates events with the status of the jobs it is assigned, and produces them to the status queue 1110. Through the status listeners 1125 and heart beat listeners 1130 running in the controller, the agent management console component obtains the heart beat information for each of the agents associated with it. It also obtains the report on the number of processes active in each agents, number of jobs processed in a time window, the disk usage, instantaneous memory usage in the agent environment by the agent process, the CPU utilization by the agent process, which allows efficient load balancing.

Referring next to FIGS. 14A-14B, which are joined at points M, N, P and Q, a state diagram illustrates the relationship between the controller 115 and agent groups. The process starts at 1400, with the start of a unit, and a query determines whether a unit is associated with an agent or an agent group. If the unit is associated with an agent, the agent status from agent groups 330A and 330B (FIG. 14B) is retrieved at 1410. If not, an agent is assigned, step 1415. If the unit is already assigned to an agent, the controller identifies the active agent with the least active threads, 1420 and may reassign the unit to the agent to achieve load balancing. Once the unit has been associated with an agent, the process completes at 1425.

Figure 15:
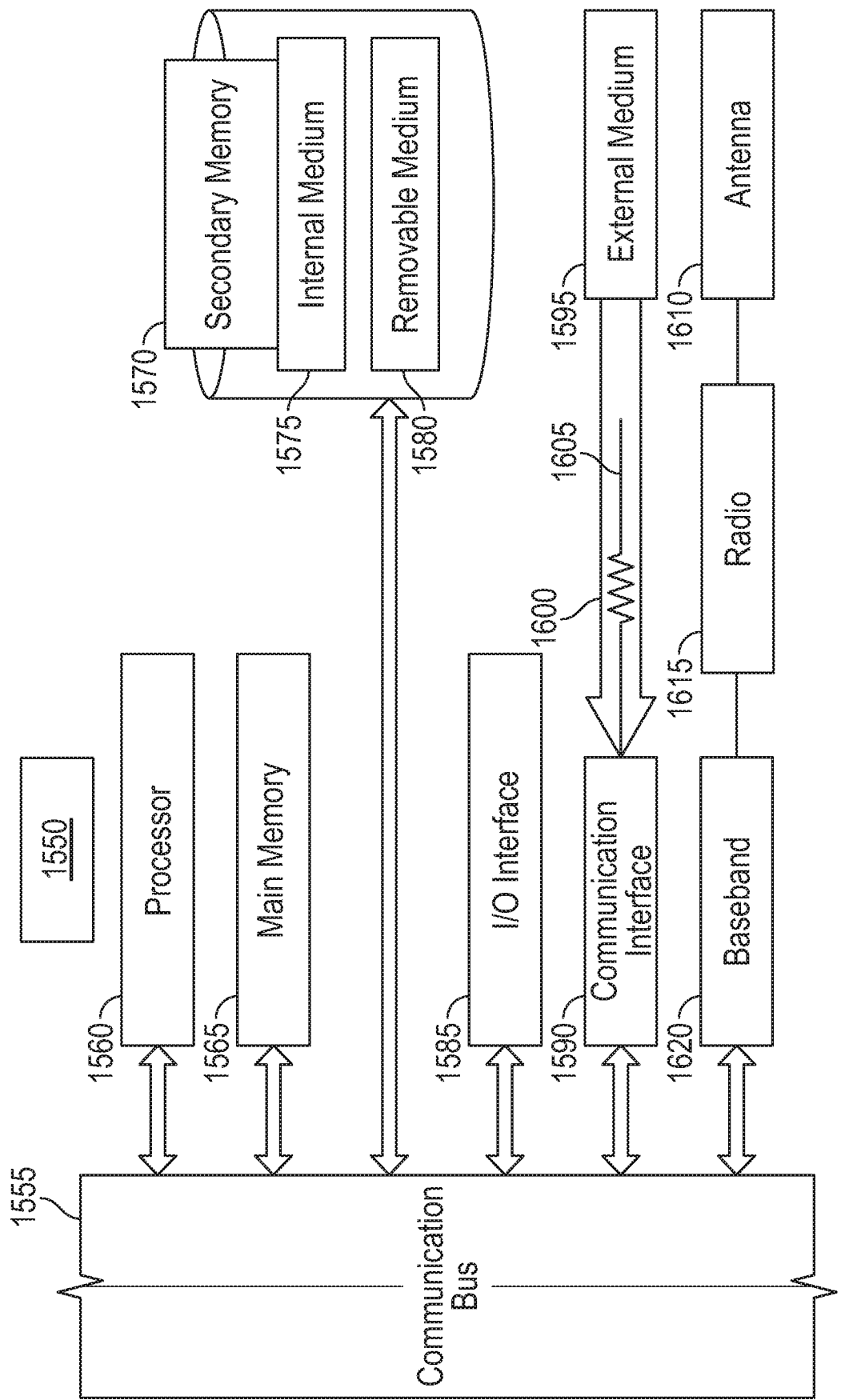
FIG. 15 is a block diagram illustrating an example wired or wireless processor enabled device that may be used in connection with various embodiments described herein.

FIG. 15 is a block diagram illustrating an example wired or wireless system 1550 that may be used in connection with various embodiments described herein. For example the system 1550 may be used as or in conjunction with a data system (such as a data source or a data target), an agent, a controller, a metadata/rules engine, a server farm, or any other processing device or machine as previously described herein. The system 1550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 1550 preferably includes one or more processors, such as processor 1560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 1560.

The processor 1560 is preferably connected to a communication bus 1555. The communication bus 1555 may include a data channel for facilitating information transfer between storage and other peripheral components of the system 1550. The communication bus 1555 further may provide a set of signals used for communication with the processor 1560, including a data bus, address bus, and control bus (not shown). The communication bus 1555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 1550 preferably includes a main memory 1565 and may also include a secondary memory 1570. The main memory 1565 provides storage of instructions and data for programs executing on the processor 1560. The main memory 1565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 1570 may optionally include a internal memory 1575 and/or a removable medium 1580, for example a floppy disk drive, a magnetic tape drive, a compact disc ("CD") drive, a digital versatile disc ("DVD") drive, etc. The removable medium 1580 is read from and/or written to in a well-known manner. Removable storage medium 1580 may be, for example, a floppy disk, magnetic tape, CD, DVD, SD card, etc.

The removable storage medium 1580 is a non-transitory computer readable medium having stored thereon computer executable code (i.e., software) and/or data. The computer software or data stored on the removable storage medium 1580 is read into the system 1550 for execution by the processor 1560.

In alternative embodiments, secondary memory 1570 may include other similar means for allowing computer programs or other data or instructions to be loaded into the system 1550. Such means may include, for example, an external storage medium 1595 and an interface 1570. Examples of external storage medium 1595 may include an external hard disk drive or an external optical drive, or and external magneto-optical drive.

Other examples of secondary memory 1570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 1580 and communication interface 1590, which allow software and data to be transferred from an external medium 1595 to the system 1550.

System 1550 may also include an input/output ("I/O") interface 1585. The I/O interface 1585 facilitates input from and output to external devices. For example the I/O interface 1585 may receive input from a keyboard or mouse and may provide output to a display. The I/O interface 1585 is capable of facilitating input from and output to various alternative types of human interface and machine interface devices alike.

System 1550 may also include a communication interface 1590. The communication interface 1590 allows software and data to be transferred between system 1550 and external devices (e.g. printers), networks, or information sources. For example, computer software or executable code may be transferred to system 1550 from a network server via communication interface 1590. Examples of communication interface 1590 include a modem, a network interface card ("NIC"), a wireless data card, a communications port, a PCMCIA slot and card, an infrared interface, and an IEEE 1394 fire-wire, just to name a few.

Communication interface 1590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/ Internet protocol ("TCP/IP"), serial line Internet protocol/ point to point protocol ("SLIP/PPP"), and so on, but may also implement customized or non-standard interface protocols as well.

Software and data transferred via communication interface 1590 are generally in the form of electrical communication signals 1605. These signals 1605 are preferably provided to communication interface 1590 via a communication channel 1600. In one embodiment, the communication channel 1600 may be a wired or wireless network, or any variety of other communication links. Communication channel 1600 carries signals 1605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 1565 and/or the secondary memory 1570. Computer programs can also be received via communication interface 1590 and stored in the main memory 1565 and/or the secondary memory 1570. Such computer programs, when executed, enable the system 1550 to perform the various functions of the present invention as previously described.

In this description, the term "computer readable medium" is used to refer to any non-transitory computer readable storage media used to provide computer executable code (e.g., software and computer programs) to the system 1550. Examples of these media include main memory 1565, secondary memory 1570 (including internal memory 1575, removable medium 1580, and external storage medium 1595), and any peripheral device communicatively coupled with communication interface 1590 (including a network information server or other network device). These non-transitory computer readable mediums are means for providing executable code, programming instructions, and software to the system 1550.

In an embodiment that is implemented using software, the software may be stored on a computer readable medium and loaded into the system 1550 by way of removable medium 1580, I/O interface 1585, or communication interface 1590. In such an embodiment, the software is loaded into the system 1550 in the form of electrical communication signals 1605. The software, when executed by the processor 1560, preferably causes the processor 1560 to perform the inventive features and functions previously described herein.

The system 1550 also includes optional wireless communication components that facilitate wireless communication over a voice and over a data network. The wireless communication components comprise an antenna system 1610, a radio system 1615 and a baseband system 1620. In the system 1550, radio frequency ("RF") signals are transmitted and received over the air by the antenna system 1610 under the management of the radio system 1615.

In one embodiment, the antenna system 1610 may comprise one or more antennae and one or more multiplexors (not shown) that perform a switching function to provide the antenna system 1610 with transmit and receive signal paths. In the receive path, received RF signals can be coupled from a multiplexor to a low noise amplifier (not shown) that amplifies the received RF signal and sends the amplified signal to the radio system 1615.

In alternative embodiments, the radio system 1615 may comprise one or more radios that are configured to communicate over various frequencies. In one embodiment, the radio system 1615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 1615 to the baseband system 1620.

If the received signal contains audio information, then baseband system 1620 decodes the signal and converts it to an analog signal. Then the signal is amplified and sent to a speaker. The baseband system 1620 also receives analog audio signals from a microphone. These analog audio signals are converted to digital signals and encoded by the baseband system 1620. The baseband system 1620 also codes the digital signals for transmission and generates a baseband transmit audio signal that is routed to the modulator portion of the radio system 1615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 1610 where the signal is switched to the antenna port for transmission.

The baseband system 1620 is also communicatively coupled with the processor 1560. The central processing unit 1560 has access to data storage areas 1565 and 1570. The central processing unit 1560 is preferably configured to execute instructions (i.e., computer programs or software) that can be stored in the memory 1565 or the secondary memory 1570. Computer programs can also be received from the baseband processor 1610 and stored in the data storage area 1565 or in secondary memory 1570, or executed upon receipt. Such computer programs, when executed, enable the system 1550 to perform the various functions of the present invention as previously described. For example, data storage areas 1565 may include various software modules (not shown) that are executable by processor 1560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A technical system comprising:
    one or more non-transitory computer readable mediums configured to store executable programmed modules;
    one or more processors, each of the one or more processors communicatively coupled with at least one of the non-transitory computer readable mediums, the one or more processors configured to:
        send first data set extraction instructions to a first agent by a controller;
        send first data set transformation instructions to a second agent by the controller;
        extract a first data set from a first data system by the first agent in accordance with the first data set extraction instructions;
        send the first data set to the second agent via a network by the first agent in accordance with the first data set extraction instructions;
        load the first data set to a second data system by the second agent;
        provide the first data set transformation instructions to the second data system by the second agent;
        send second data set extraction instructions to the second agent by the controller;
        send second data set transformation instructions to a third agent by the controller;
        extract a second data set from the second data system by the second agent in accordance with the second data set extraction instructions, wherein the second data set corresponds to at least a portion of the first data set;
        send the second data set to the third agent via a network by the second agent in accordance with the second data set extraction instructions;
        load the second data set to a third data system by the third agent; and
        provide the second data set transformation instructions to the third data system by the second agent.

2. The system of claim 1, wherein the second data system executes the first data set transformation instructions on the first data set.

3. The system of claim 1, wherein the first agent is further configured to compress the extracted first data set prior to sending the first data set.

4. The system of claim 1, wherein the first agent is further configured to encrypt the extracted first data set prior to sending the first data set.

5. The system of claim 1, wherein the first agent is further configured to compress and encrypt the extracted first data set prior to sending the first data set.

6. The system of claim 1, wherein the first agent is further configured to audit the sending of the first data set to the second agent.

7. The system of claim 1, wherein the third data system executes the second data set transformation instructions on the second data set.

8. The system of claim 1, wherein the second agent is further configured to compress the extracted second data set prior to sending the second data set.

9. The system of claim 1, wherein the second agent is further configured to encrypt the extracted second data set prior to sending the second data set.

10. The system of claim 1, wherein the second agent is further configured to compress and encrypt the extracted second data set prior to sending the second data set.

11. The system of claim 1, wherein the second agent is further configured to audit the sending of the second data set to the third agent.

12. A method for viewing intermediate transformations, comprising:
    identifying a plurality of transformation rules comprising a first transformation unit;
    presenting on a user interface a representation of a first data set;
    applying a first of the plurality of transformation rules to the first data set to generate a first modified first data set;
    presenting on the user interface a representation of the first modified data set to be further modified by application of a second of the plurality of transformation rules;
    receiving an instruction to modify the second of the plurality of transformation rules and generating a modified second of the plurality of transformation rules;
    applying the modified second of the plurality of transformation rules to the first modified first data set to generate a second modified first data set;

presenting on the user interface a representation of the second modified first data set;

receiving an instruction to finalize the plurality of transformation rules comprising the first transformation unit; and finalizing the plurality of transformation rules comprising the first transformation unit and finalizing the first transformation unit.

13. The method of claim 12, wherein the second modified first data set is to be further modified by application of a third of the plurality of transformation rules, further comprising prior to receiving the instruction to finalize:

receiving an instruction to modify the third of the plurality of transformation rules and generating a modified third of the plurality of transformation rules;

applying the modified third of the plurality of transformation rules to the second modified first data set to generate a third modified first data set; and presenting on the user interface a representation of the third modified first data set.

14. The method of claim 13, wherein the third modified first data set is to be further modified by application of a fourth of the plurality of transformation rules, further comprising prior to receiving the instruction to finalize:

receiving an instruction to modify the fourth of the plurality of transformation rules and generating a modified fourth of the plurality of transformation rules;

applying the modified fourth of the plurality of transformation rules to the third modified first data set to generate a fifth modified first data set; and presenting on the user interface a representation of the fifth modified first data set.

15. A technical system comprising:

at least one controller apparatus comprising one or more non-transitory computer readable mediums configured to store executable programmed modules and data and one or more processors, each of the one or more processors communicatively coupled with at least one of the non-transitory computer readable mediums;

a plurality of first agents communicatively coupled with the at least one controller apparatus via a network, each first agent comprising one or more non-transitory computer readable mediums configured to store executable programmed modules and data and one or more processors, each of the one or more processors communicatively coupled with at least one of the non-transitory computer readable mediums, wherein each of the plurality of first agents corresponds to at least one data system;

a plurality of second agents communicatively coupled with the at least one controller apparatus via a network and communicatively coupled with at least one of the plurality of first agents via a network, each second agent comprising one or more non-transitory computer readable mediums configured to store executable programmed modules and data and one or more processors, each of the one or more processors communicatively coupled with at least one of the non-transitory computer readable mediums, wherein each of the plurality of second agents corresponds to at least one data system;

wherein the controller is further configured to:
send first data set extraction instructions to one or more of the plurality of first agents; and
send first data set transformation instructions to one or more of the plurality of second agents;

wherein each of the one or more first agents receiving first data set extraction instructions from the controller is further configured to:
extract a first data set from its respective corresponding data system in accordance with the first data set extraction instructions; and
send the extracted first data set to one of the plurality of second agents via a network in accordance with the first data set extraction instructions, wherein the second agent received first data set transformation instructions from the controller;

wherein each of the one or more second agents receiving an extracted first data set from a first agent and receiving first data set transformation instructions from the controller is further configured to:
load the first data set to its respective corresponding data system; and
provide the first data set transformation instructions to its respective corresponding data system.

16. The system of claim 15, wherein each second agent corresponding data system executes its respective first data set transformation instructions on its respective first data set.

17. The system of claim 15, wherein each of the one or more first agents is further configured to compress the extracted first data set prior to sending the extracted first data set.

18. The system of claim 15, wherein each of the one or more first agents is further configured to encrypt the extracted first data set prior to sending the extracted first data set.

19. The system of claim 15, wherein each of the one or more first agents is further configured to compress and encrypt the extracted first data set prior to sending the extracted first data set.

20. The system of claim 15, wherein each of the one or more first agents is further configured to audit the sending of the extracted first data set.

* * * * *